US012603777B2

(12) United States Patent
Hans et al.

(10) Patent No.: US 12,603,777 B2
(45) Date of Patent: Apr. 14, 2026

(54) EXECUTING DIGITAL SIGNATURE OPERATIONS IN A SECURE ELEMENT PLATFORM RUNTIME ENVIRONMENT

(71) Applicant: Oracle International Corporation, Redwood Shores, CA (US)

(72) Inventors: Sebastian Jürgen Hans, Berlin (DE); Nicolas Michel Raphaël Ponsini, Mougins (FR)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 18/756,159

(22) Filed: Jun. 27, 2024

(65) Prior Publication Data

US 2026/0058812 A1      Feb. 26, 2026

Related U.S. Application Data

(60) Provisional application No. 63/595,907, filed on Nov. 3, 2023.

(51) Int. Cl.
| | |
|---|---|
| *H04L 9/32* | (2006.01) |
| *H04L 9/00* | (2022.01) |
| *H04L 9/08* | (2006.01) |

(52) U.S. Cl.
CPC ............ *H04L 9/321* (2013.01); *H04L 9/0861* (2013.01); *H04L 9/3236* (2013.01); *H04L 9/50* (2022.05)

(58) Field of Classification Search
CPC ..... H04L 9/321; H04L 9/0861; H04L 9/3236; H04L 9/50
See application file for complete search history.

(56) References Cited

U.S. PATENT DOCUMENTS

| | | | |
|---|---|---|---|
| 10,218,511 B2 * | 2/2019 | Campagna | ............ H04L 9/0643 |
| 10,880,278 B1 * | 12/2020 | de Quehen | ........... H04L 9/0838 |

(Continued)

FOREIGN PATENT DOCUMENTS

| | | | |
|---|---|---|---|
| EP | 3758290 A1 | 12/2020 | |
| EP | 4440036 A1 * | 10/2024 | ........... H04L 9/3236 |

(Continued)

OTHER PUBLICATIONS

Ando, M., et al., "Hash-based TPM signatures for the quantum world.", International Conference on Applied Cryptography and Network Security, Jun. 9, 2016, pp. 77-94.

(Continued)

*Primary Examiner* — John B King
(74) *Attorney, Agent, or Firm* — Invoke

(57) ABSTRACT

One or more embodiments initialize a signature validation object in a secure element (SE) platform runtime environment and utilize the signature validation object to perform signature validation operations. A system accesses an authentication path that includes a set of hash values corresponding to a set of nodes of a tree structure associated with a hash-based signature protocol utilized to generate a digital signature. The system computes a root hash value corresponding to a root node of the tree structure based on the set of hash values of the authentication path. The system verifies the root hash value against a root public key associated with the digital signature. The system determines that the digital signature is valid responsive at least in part to successfully verifying the root hash value against the root public key.

20 Claims, 18 Drawing Sheets

(56)  References Cited

U.S. PATENT DOCUMENTS

| | | | | |
|---|---|---|---|---|
| 12,063,313 | B2 * | 8/2024 | De Santis | H04L 9/50 |
| 12,445,303 | B2 * | 10/2025 | van Vredendaal | H04L 9/0866 |
| 2004/0221158 | A1 * | 11/2004 | Olkin | H04L 9/3236 |
| | | | | 713/170 |
| 2010/0042842 | A1 * | 2/2010 | Huang | H04L 9/3247 |
| | | | | 380/46 |
| 2016/0266943 | A1 * | 9/2016 | Hans | G06F 9/54 |
| 2019/0171849 | A1 * | 6/2019 | Assenmacher | G06F 16/9014 |
| 2019/0319801 | A1 * | 10/2019 | Sastry | H04L 9/3239 |
| 2019/0319802 | A1 | 10/2019 | Misoczki et al. | |
| 2021/0073647 | A1 * | 3/2021 | Hunter | G06F 16/1858 |
| 2021/0099309 | A1 * | 4/2021 | Winarski | H04L 67/1097 |
| 2022/0086009 | A1 * | 3/2022 | Vacek | H04L 9/0877 |
| 2022/0131707 | A1 * | 4/2022 | Chen | H04L 9/50 |
| 2022/0191037 | A1 * | 6/2022 | Hassanzadeh Nazarabadi | |
| | | | | H04L 9/3239 |
| 2022/0255735 | A1 | 8/2022 | Masny et al. | |
| 2022/0263663 | A1 * | 8/2022 | Chen | H04L 9/50 |
| 2022/0278859 | A1 * | 9/2022 | Mackay | G06Q 20/382 |
| 2024/0080204 | A1 * | 3/2024 | Van Vredendaal | H04L 9/3247 |
| 2024/0356736 | A1 * | 10/2024 | Relyea | H04L 9/3236 |
| 2025/0148071 | A1 * | 5/2025 | Ponsini | G06F 21/53 |
| 2025/0150282 | A1 * | 5/2025 | Hans | H04L 9/0852 |

FOREIGN PATENT DOCUMENTS

| | | | | | |
|---|---|---|---|---|---|
| WO | 2019/071026 | A1 | 4/2019 | | |
| WO | 2021/062517 | A1 | 4/2021 | | |
| WO | WO-2025096254 | A1 * | 5/2025 | | H04L 9/0844 |
| WO | WO-2025096266 | A1 * | 5/2025 | | H04L 9/0877 |
| WO | WO-2025096268 | A1 * | 5/2025 | | H04L 9/50 |

OTHER PUBLICATIONS

Banerjee T. et al., "Post-Quantum Cryptography for Engineers", draft-ietfpquip-pqc-engineers-00; draft-ietf-pquip-pqc-engineers-00.txt, Internet-draft: Pquip, Internet Engineering Task Force, Ietf, Standardworkingdraft, Retrieved from URL: https://tools.ietf.org/html/draft-ietf-pquip-pqc-engineers-00, Aug. 30, 2023, 33 Pages.

Chalkias, K., et al., "Blockchained post-quantum signatures.", International Conference on Internet of Things, Jul. 30, 2018, pp. 1196-1203.

Iftikhar, Z., et al., "Quantum safe cloud computing using hash-based digital signatures.", International Conference on Automation and Computing, Sep. 2, 2021, pp. 1-6.

Ulitzsch V.Q., et al., "A Post-Quantum Secure Subscription Concealed Identifier for 6G", Proceedings of the Twelveth Acm Conference On Data and Application Security and Privacy, Acmpub27, May 16-19, 2022, pp. 157-168 (13 Pages).

"Comments Requested on Three Draft FIPS for Post-Quantum Cryptography," CSRC, Aug. 24, 2023, pp. 3., Feb. 14, 2024.

"CYBER; Quantum-safe Hybrid Key Exchanges," TS 103 744 V1.1.1, Dec. 2020, pp. 42.

"Java Card Platform Specification Release Notes", Version 3.2, Jan. 2023, pp. 1-18.

"Java Card™ Platform, Application Programming Interface, Classic Edition Version 3.2", Retrieved from https://docs.oracle.com/en/java/javacard/3.2/jcapi/api_classic/index.html, Retrieved on Jul. 25, 2024, pp. 1-5.

"Runtime Environment Specification, Classic Edition", Version 3.2, Java Card™ Platform, Jan. 2023, pp. 1-136.

"Virtual Machine Specification, Classic Edition", Version 3.2, Java Card™ Platform, Jan. 2023, pp. 1-274.

Barnes. R. et al., "RFC 9180_Hybrid Public Key Encryption," Feb. 2022, pp. 85.

Cooper et al., "Recommendation for Stateful Hash-Based Signature Schemes", NIST SP 800-208, Oct. 2020, pp. 59.

Fluhrer et al., "Additional Parameter sets for HSS/LMS Hash-Based Signatures", Sep. 18, 2023, pp. 20.

Huelsing et al., "XMSS: extended Merkle Signature Scheme", Retrieved from https://datatracker.ietf.org/doc/html/rfc8391, May 2018, pp. 1-74.

McGrew et al., "Leighton-Micali Hash-Based Signatures", Apr. 2019, pp. 1-61.

National Institute of Standards and Technology, "Stateless Hash-Based Digital Signature Standard", FIPS 205 (Draft), Aug. 24, 2023, pp. 58.

Ounsworth. M. et al., "Combiner function for hybrid key encapsulation mechanisms (Hybrid KEMs)," Jan. 9, 2024, pp. 13.

Wood C., "HPKE: Standardizing public-key encryption (finally!)," Feb. 24, 2022, pp. 15.

"Document Search", Retrieved from https://datatracker.ietf.org/doc/search?name=draft-ietf-lamps-pq-composit&rfcs=on&activedrafts=on&olddrafts=on, Retrieved on Mar. 4, 2025, p. 1.

"Falcon: Fast-Fourier Lattice-based Compact Signatures over NTRU", Specification v1.2, Jan. 10, 2020, pp. 1-67.

"Information technology—Open Systems Interconnection—The Directory: Public-key and attribute certificate frameworks", Recommendation ITU-T X.509, Oct. 2019, pp. 236.

"ITU-T Recommendations", Retrieved from https://handle.itu.int/11.1002/1000/14033, Oct. 14, 2019, pp. 1-2.

"Module-Lattice-Based Digital Signature Standard", Federal Information Processing Standards Publication, Aug. 13, 2024, pp. 65.

Ounsworth et al., "Composite ML-DSA for use in Internet PKI", Mar. 4, 2024, 34 Pages.

Ounsworth et al., "Composite ML-DSA for use in X.509 Public Key Infrastructure and CMS", Mar. 3, 2025, pp. 65.

* cited by examiner

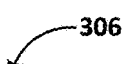

Initialize, in a secure element (SE) platform runtime environment, an SE application object that includes a signature generation element for generating a digital signature

310

Obtain, via the SE application object, a message digest to be digitally signed

312

Determine, via the SE application object, a digital signature protocol for generating a digital signature for the message digest

314

Determine, via the SE application object, a key pair including a private key and a public key for use in generating the digital signature in accordance with the digital signature protocol

316

Generate, via the SE application object, an authentication path corresponding to the key pair

318

Generate, via the SE application object, a digital signature for the message by utilizing the private key of the key pair to execute a signature generation algorithm upon the message digest in accordance with the digital signature protocol

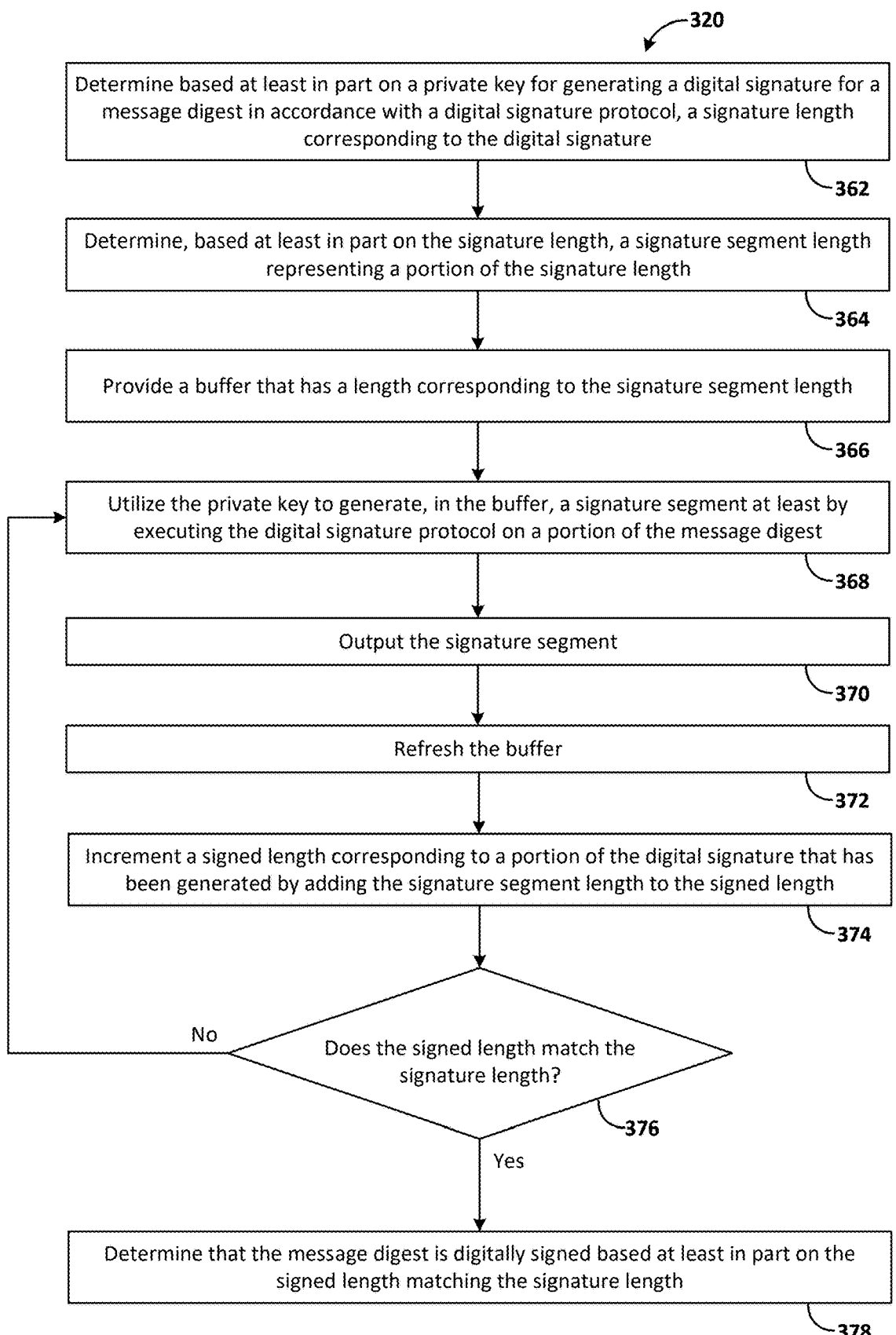

320

Determine based at least in part on a private key for generating a digital signature for a message digest in accordance with a digital signature protocol, a signature length corresponding to the digital signature

362

Determine, based at least in part on the signature length, a signature segment length representing a portion of the signature length

364

Provide a buffer that has a length corresponding to the signature segment length

366

Utilize the private key to generate, in the buffer, a signature segment at least by executing the digital signature protocol on a portion of the message digest

368

Output the signature segment

370

Refresh the buffer

372

Increment a signed length corresponding to a portion of the digital signature that has been generated by adding the signature segment length to the signed length

374

Does the signed length match the signature length?

No

376

Yes

Determine that the message digest is digitally signed based at least in part on the signed length matching the signature length

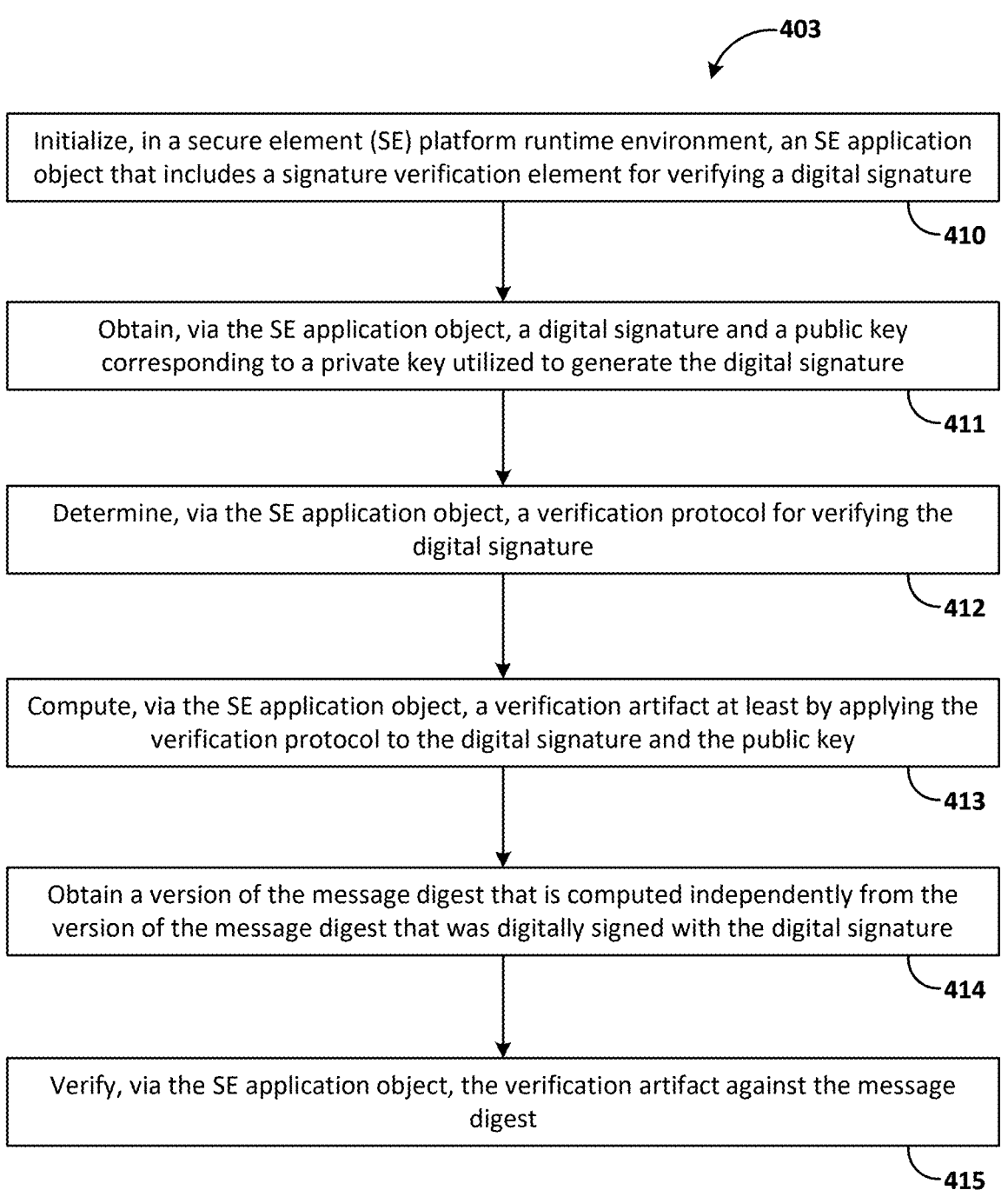

403

Initialize, in a secure element (SE) platform runtime environment, an SE application object that includes a signature verification element for verifying a digital signature

410

Obtain, via the SE application object, a digital signature and a public key corresponding to a private key utilized to generate the digital signature

411

Determine, via the SE application object, a verification protocol for verifying the digital signature

412

Compute, via the SE application object, a verification artifact at least by applying the verification protocol to the digital signature and the public key

413

Obtain a version of the message digest that is computed independently from the version of the message digest that was digitally signed with the digital signature

414

Verify, via the SE application object, the verification artifact against the message digest

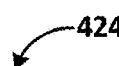

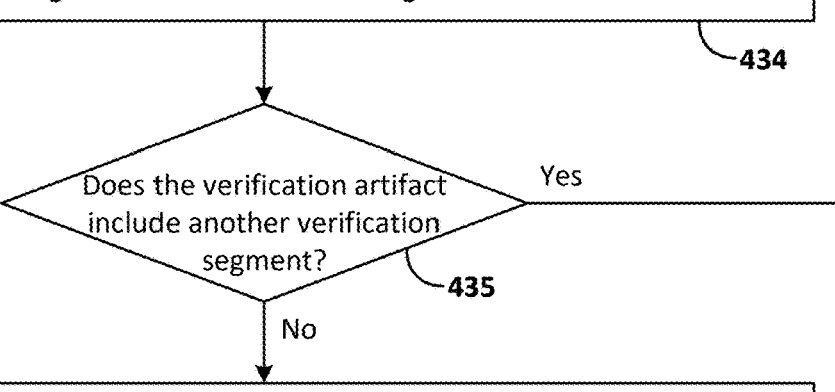

Store, in a set of memory elements of a secure element (SE) hardware device, a set of verification segments generated by a first SE application object, executing in an SE platform runtime environment

430

Initialize, in the SE platform runtime environment, a second SE application object that includes a verification segment combination object for combining the verification segments generated by the first SE application object

431

Initialize, in the SE platform runtime environment, a temporary entry point object that includes a pointer to a memory element, of the set of memory elements, corresponding to a verification segment, of the set of verification segments

432

Access a verification segment via the temporary entry point object

433

Add the verification segment to the verification segment combination element

434

Does the verification artifact include another verification segment?

Yes

435

No

Generate the verification artifact at least by combining the set of verification segments in the verification segment combination element

436

Output the verification artifact from the verification segment combination element

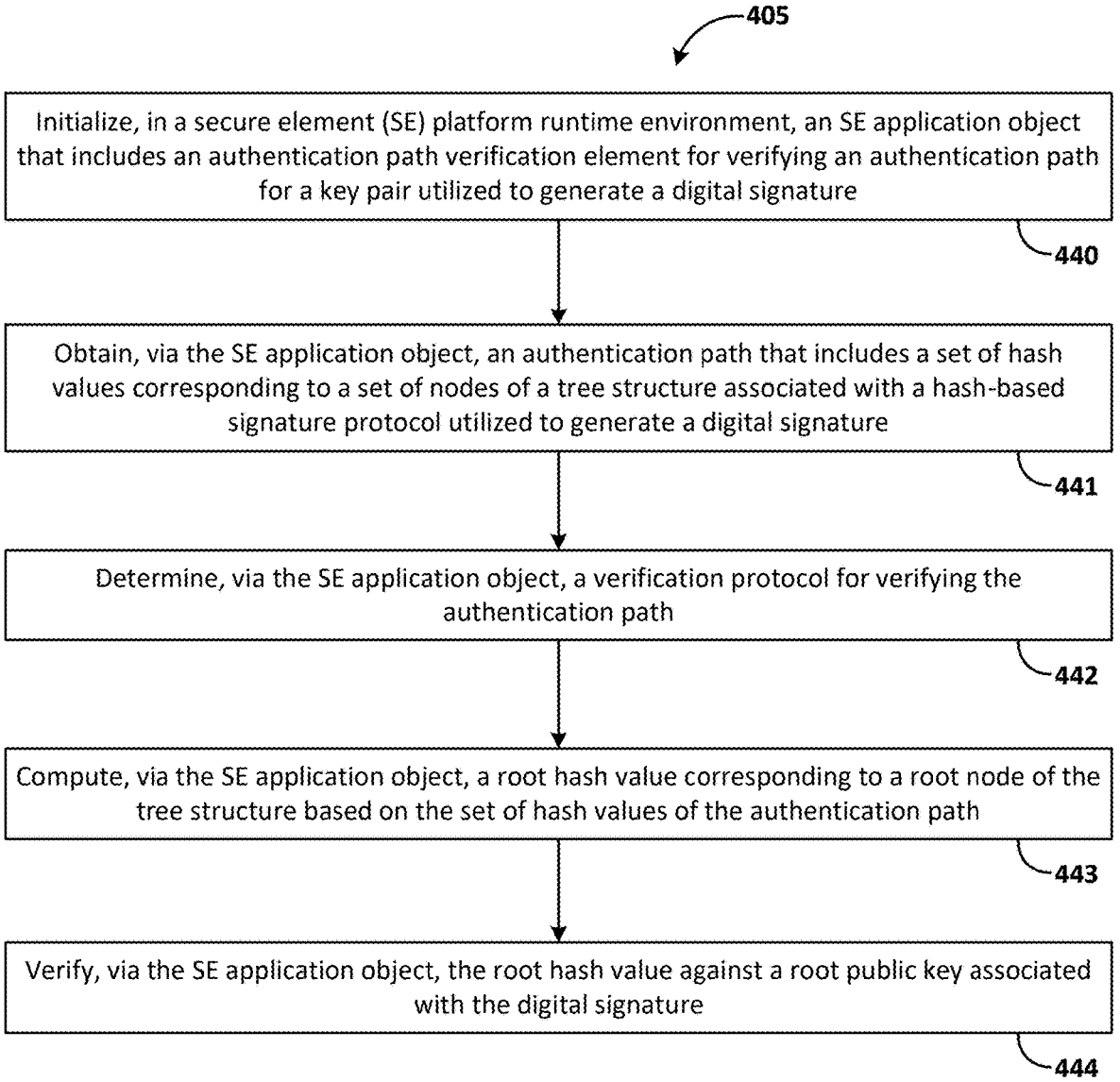

405

Initialize, in a secure element (SE) platform runtime environment, an SE application object that includes an authentication path verification element for verifying an authentication path for a key pair utilized to generate a digital signature

440

Obtain, via the SE application object, an authentication path that includes a set of hash values corresponding to a set of nodes of a tree structure associated with a hash-based signature protocol utilized to generate a digital signature

441

Determine, via the SE application object, a verification protocol for verifying the authentication path

442

Compute, via the SE application object, a root hash value corresponding to a root node of the tree structure based on the set of hash values of the authentication path

443

Verify, via the SE application object, the root hash value against a root public key associated with the digital signature

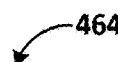
464

| Store, in a set of memory elements of a secure element (SE) hardware device, a set of hash segments generated by a first SE application object, executing in an SE platform runtime environment |
|---|

470

| Initialize, in the SE platform runtime environment, a second SE application object that includes a hash segment combination object for combining the hash segments generated by the first SE application object |
|---|

471

| Initialize, in the SE platform runtime environment, a temporary entry point object that includes a pointer to a memory element, of the set of memory elements, corresponding to a hash segment, of the set of hash segments |
|---|

472

| Access a hash segment via the temporary entry point object |
|---|

473

| Add the hash segment to the hash segment combination element |
|---|

474

Does the intermediate hash value include another hash segment?

475

Yes

No

| Generate the intermediate hash value at least by combining the set of hash segments in the hash segment combination element |
|---|

476

| Output the intermediate hash value from the hash segment combination element |
|---|

EXECUTING DIGITAL SIGNATURE OPERATIONS IN A SECURE ELEMENT PLATFORM RUNTIME ENVIRONMENT

INCORPORATION BY REFERENCE; DISCLAIMER

This application claims the benefit of U.S. Provisional Ser. No. 63/595,907, titled "EXECUTING CRYPTO-GRAPHIC OPERATIONS IN A SECURE ELEMENT PLATFORM RUNTIME ENVIRONMENT," filed on Nov. 3, 2023, the entirety of which is hereby incorporated by reference.

U.S. patent application Ser. No. 18/535,432, titled "EXECUTING CRYPTOGRAPHIC OPERATIONS IN A SECURE ELEMENT PLATFORM RUNTIME ENVIRON-MENT," filed on Dec. 11, 2023 is hereby incorporated by reference. U.S. patent application Ser. No. 18/535,432 and U.S. Provisional Ser. No. 63/595,907 are collectively referred to herein as "the '432 Application."

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to executing digital signature operations in a secure element platform runtime environment. More particularly, the present disclosure relates to executing quantum-resistant digital signature operations in a secure element platform runtime environment.

BACKGROUND

Various computing entities include a secure element (SE) platform such as a Java Card platform. SE platforms include technologies configured to provide a high level of security, for example, for use in settings that involve sensitive data or operations. As examples, SE platforms are utilized in computing entities that perform operations associated with payment systems, identity verification, or telecommunications. smart cards, mobile devices, identity cards, access control systems, payment systems, and other devices where security is of importance. Computing entities that include an SE platform may transmit messages with other computing entities, including other computing entities that include an SE platform. The computing entities utilize digital signatures to ensure the authenticity, integrity, and/or non-repudiation of the messages.

To generate a digital signature for a message being transmitted from a sending computing entity to a recipient computing entity, the sending computing entity applies a hash function to the message to generate a message digest and then digitally signs the message digest. The sending computing entity digitally signs the message digest by utilizing a private key to apply a signing operation to the message digest. The message digest is a fixed-length hash of the message that represents a unique fingerprint of the message. The signing operation includes applying a cryp-tographic operation to the message digest using the private key to generate the digital signature. The digital signature includes a cryptographic artifact generated by applying the cryptographic operation to the message digest using the private key. The sending computing entity transmits the message and the digital signature to the recipient computing entity.

To verify the digital signature, the recipient computing entity derives the message digest from the digital signature by applying a verification operation to the digital signature utilizing a public key corresponding to the private key that was utilized to generate the digital signature. The validation operation includes a cryptographic operation that is comple-mentary to the cryptographic operation of the signing opera-tion. Additionally, the recipient computing entity applies the hash function to the message to generate an additional instance of the message digest. The recipient computing entity compares the message digest derived from the veri-fication operation with the message digest derived by apply-ing the hash function. The recipient computing entity deter-mines that the digital signature is valid based at least in part on a determination that the message digest derived by applying the hash function to the message matches the message digest derived by applying the verification opera-tion to the digital signature.

The content of this background section should not be construed as prior art merely by virtue of its presence in this section.

BRIEF DESCRIPTION OF THE DRAWINGS

The embodiments are shown by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3F are flowcharts that illustrate example opera-tions pertaining to generating digital signatures in accor-dance with one or more embodiments;

FIGS. 4A-4H are flowcharts that illustrate example opera-tions pertaining to validating digital signatures in accor-dance with one or more embodiments.

DETAILED DESCRIPTION

Figure 1:
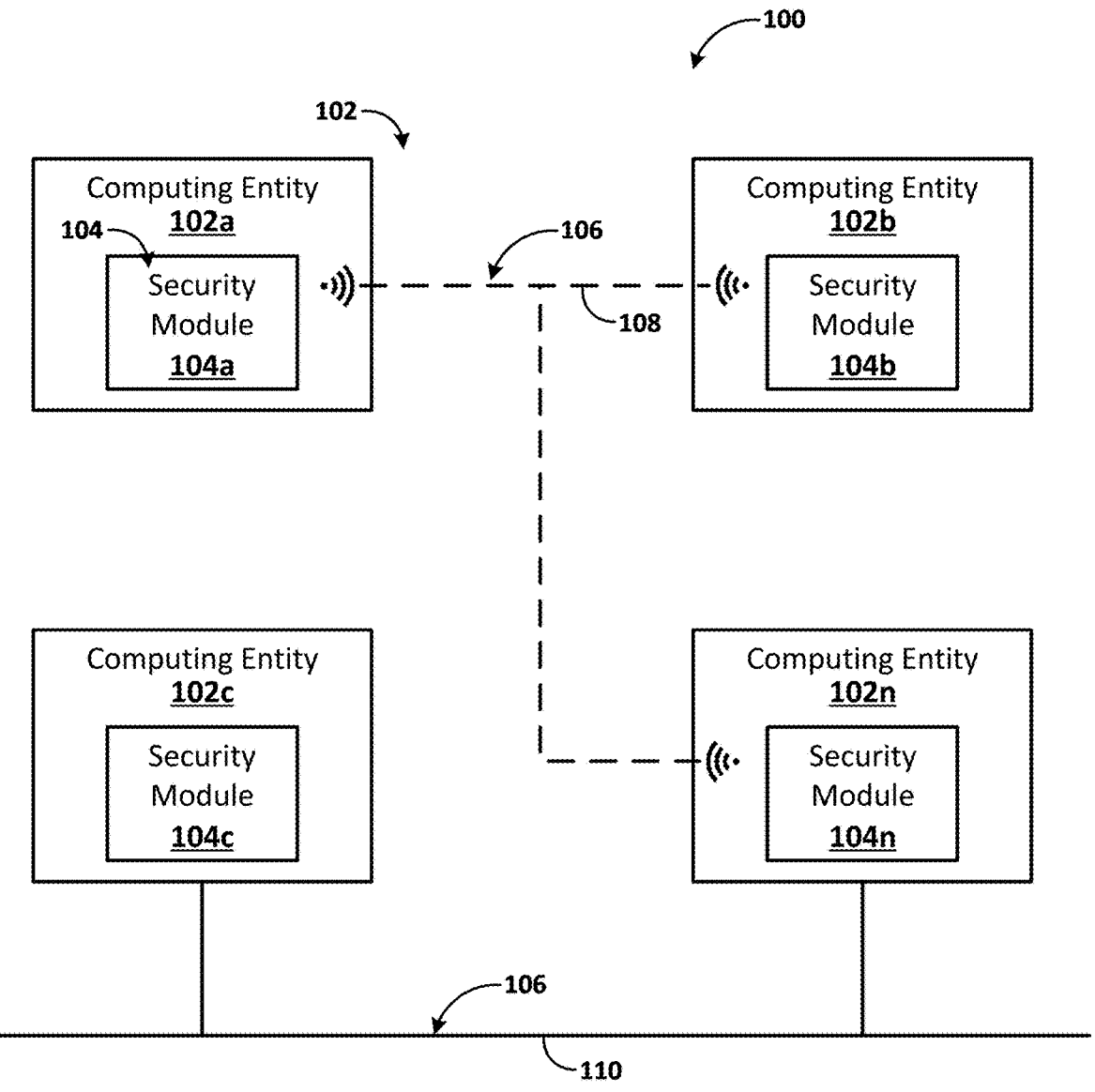
FIG. 1 illustrates an example message exchange system in accordance with one or more embodiments.

In the following description, for the purposes of expla-nation, numerous specific details are set forth in order to provide a thorough understanding. Detailed examples are described below for purposes of clarity. One or more embodiments may be practiced without these specific details. Components and/or operations described below should be understood as one specific example which may not be applicable to certain embodiments. Features described in one embodiment may be combined with fea-tures described in a different embodiment. In some examples, well-known structures and devices are described with reference to a block diagram form in order to avoid unnecessarily obscuring the present invention. Components and/or operations described below should not be construed as limiting the scope of any of the claims.

1. GENERAL OVERVIEW
2. EXAMPLE MESSAGE EXCHANGE SYSTEM
3. EXAMPLE DIGITAL SIGNATURE ALGORITHMS

3

4. EXAMPLE COMPUTING ENTITY ARCHITEC-
   TURE
5. EXAMPLE DIGITAL SIGNATURE OPERATIONS
6. COMPUTER NETWORKS AND CLOUD NET-
   WORKS
7. MICROSERVICE APPLICATIONS
8. HARDWARE OVERVIEW
9. MISCELLANEOUS; EXTENSIONS

1. GENERAL OVERVIEW

One or more embodiments utilize an SE platform such as a Java Card platform to generate digital signatures within a runtime environment of the SE platform. The digital signatures can be utilized to verify the authenticity or integrity of messages. Additionally, or alternatively, one or more embodiments utilize an SE platform such as a Java Card platform to validate digital signatures within a runtime environment of the SE platform. Upon validating a digital signature associated with a message, one or more embodiments determine that the message is authentic, that the message has not been altered or tampered with, and/or that that the sender cannot deny having sent the message.

In one example, a system generates digital signatures by executing digital signature operations in the SE platform runtime environment. The digital signatures may include hash-based digital signatures generated based on a hash-based signature protocol that includes one or more hash-based digital signature algorithms. The hash-based signature protocol may include a stateful hash-based signature protocol, a stateless hash-based signature protocol, or a one-time hash-based signature protocol, as well as combinations of these. The hash-based digital signatures are resistant to cryptographic attacks from quantum computers that have large computational resources and that utilize principles of quantum mechanics to perform advanced computations exponentially faster than classical computers. The hash-based security protocols utilize hash functions that are inherently resistant to quantum attacks. Additionally, the hash-based security protocols can be implemented with unique, single-use key pairs and stateful structures that provide resilience against key compromise.

One or more techniques described herein utilize hash-based signature protocols to generate quantum resistant digital signatures within the context of SE hardware devices such as Java Card devices that have limited computational resources. In one example, a system initializes a signature generation object in the SE platform runtime environment to generate digital signatures based on a hash-based signature protocol. The system generates a private key for generating the digital signature based on a key pair index and a parameter set maintained in persistent memory of the SE hardware. The parameter set stores parameters of a tree structure that represents a set of one-time key pairs, allowing the system to generate a unique one-time key pair and an authentication path for the one-time key pair without maintaining the entire tree structure in memory.

In one example, the system utilizes an incremental hashing process to execute the hash-based signature protocol while consuming a limited amount of computational resources. The incremental hashing process allows the signature generation object to generate a set of signature segments that are combined to provide the full digital signature. The signature segments can be combined within or outside of the SE platform runtime environment while maintaining the quantum resistance of the digital signature attributable to the hash-based security protocol and the one-time use of the key pair.

In one example, the system generates a digital signature for a message by applying the hash-based signature protocol to a message digest that includes a hash value generated by applying a hash function to the message. The message digest can be generated outside of the SE platform runtime environment while maintaining the quantum resistance of the digital signature attributable to the hash-based security protocol and the one-time use of the key pair. Additionally, or alternatively, the system can generate the message digest within the SE platform runtime environment by utilizing an incremental hashing.

In one example, a system utilizes a signature validation object in the SE platform runtime environment to validate digital signatures by executing signature validation operations in the SE platform runtime environment. The digital signatures may include hash-based digital signatures generated based on a hash-based signature protocol that includes one or more hash-based digital signature algorithms. The signature validation operations may include verifying the digital signature by executing a verification protocol corresponding to the hash-based signature protocol utilized to generate the digital signature. Additionally, or alternatively, the signature validation operations may include executing the verification protocol to verify an authentication path corresponding to the one-time key pair utilized to generate the digital signature.

In one example, the system utilizes an incremental hashing process to execute signature verification operations while consuming a limited amount of computational resources. The system may utilize the incremental hashing process to verify digital signature. The incremental hashing process allows the signature validation object to generate a set of verification segments that are combined to provide a verification artifact for verifying the digital signature. The verification segments can be combined within or outside of the SE platform runtime environment while maintaining the quantum resistance of the digital signature attributable to the hash-based security protocol and the one-time use of the key pair.

Additionally, or alternatively, the system may utilize the incremental hashing process to verify an authentication path. The incremental hashing process allows the signature validation object to generate a set of hash segments that are combined to provide an intermediate hash value for verifying the authentication path. The system may utilize the incremental hashing process to generate one or more intermediate hash values for verifying the authentication path. The hash segments can be combined within or outside of the SE platform runtime environment while maintaining the quantum resistance of the digital signature attributable to the hash-based security protocol and the one-time use of the key pair.

In one example, the particular digital signature protocols and/or algorithms utilized in the digital signature operations and/or in the signature validation options may be selected via one or more digital signature modules. The one or more digital signature modules may be provided by an application programming interface (API). The system may initiate an SE application object in the SE platform runtime environment, and the SE application object may access and execute one or more of the digital signature modules. Additionally, or in the alternative, system may execute one or more of the digital signature modules within a logical secure element (LSE) of the SE platform runtime environment. Further, one or more digital signature modules may be incorporated into one or more SE applications, or applets, located within a particular LSE, and the respective SE application may execute the one or more digital signature modules within the particular LSE to perform the corresponding digital signature operations and/or signature validation operations.

In one example, various SE applications are executed in a particular LSE of the SE platform runtime environment. A particular LSE may be utilized to execute one or more objects of an SE application. In this way, the digital signature operations are securely contained within the particular LSE. Additionally, or in the alternative, separate LSEs may be utilized to execute separate SE applications, thereby isolating the particular digital signature operations to their respective LSEs. Advantageously, the algorithms and parameters associated with the digital signature operations remain securely within the SE platform runtime environment. Further, in the event that an SE application, or its algorithms or parameters, has a vulnerability or becomes compromised, the execution of the various SE applications within separate LSEs provides assurance that a resulting security exposure would be confined to the particular LSE where the vulnerability or comprise is located. Hence, other SE applications, and their algorithms and parameters, remain securely contained within their respective LSEs.

This General Overview section is intended to provide a general overview without addressing all aspects of the present disclosure. The full scope of the presently disclosed subject matter is understood from the content of the present disclosure in its entirety.

2. EXAMPLE MESSAGE EXCHANGE SYSTEMS

Referring now to FIG. 1, example message exchange systems 100 are described. A message exchange system 100 may include a set of computing entities 102, such as computing entity 102a, computing entity 102b, computing entity 102c, and/or computing entity 102n. One or more of the computing entities 102a-n may include a security module 104. A computing entity 102 may utilize a security module 104 to exchange digital signatures and/or digitally signed messages with another computing entities 102. Additionally, or alternatively, a computing entity may utilize the security module 104 exchange encrypted messages with another computing entity 102, for example, as described in the '432 Application. In one example, a computing entity utilizes the security module 104 exchange digitally signed encrypted messages with another computing entity 102. A security module 104 may include an SE hardware component. The SE hardware component may be configured as described with reference to FIGS. 2A and 2B. Additionally, or alternatively, the SE hardware component may be configured as described with reference to the '432 Application.

The computing entities 102 are configured to exchange digital signatures and/or digitally signed messages via a wired or wireless connection. In one example, the computing entities 102 are configured to connect to one or more data communication networks 106. The one or more data communication networks 106 may include a wireless network 108 and/or a wired network 110. Example data communication networks include Global Systems for Mobile (GSM), Code Division Multiple Access (CDMA), Universal Mobile Telecommunication System (UMTS), Long Term Evolution (LTE), General Packet Radio Service (GPRS), Universal Mobile Telecommunications System (UMTS), Broadband Global Area Network (BGAN), wireless local area network (WLAN), Personal Area Networks (PAN), Local Area Networks (LAN), Metropolitan Area Networks (MAN), Wide Area Networks (WAN), Internet-of-Things (IOT) networks, Satellite Networks, cloud computing networks, or Ethernet networks. Example PAN networks may include Ultra-wideband networks, Bluetooth networks, Zigbee networks, Near-field communication networks. Example LAN networks may include Wi-Fi networks or WLAN networks. Example MAN networks may include Worldwide Interoperability for Microwave Access (WiMAX networks). Example WAN networks may include cellular networks (e.g., 2G, 3G, 4G, or 5G mobile networks). Example IoT networks may include Ultra-wideband networks, Matter networks, Zigbee networks, LoRa networks, or Sigfox networks.

The computing entities 102 may be different devices, or different components of a particular device. The computing entities 102 may respectively include one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a smart card, a personal digital assistant (PDA), a wireless receiver and/or transmitter, a base station, a communication management device, a router, a switch, a controller, an access point, and/or a browser device.

In one example, the system 100 includes at least one host device and at least one client device. The host device and/or the client device may include a computing entity 102 configured as described with reference to FIG. 1. One or more of the computing entities 102 described with reference to FIG. 1 may be a host device or a client device. In one example, a first computing entity 102 may operate as a host device with respect to a second computing entity 102 and as a client device with respect to a third computing entity 102.

In one example, a client device is configured as a smart card, such as an EMV card, or a universal integrated circuit card (UICC). A UICC is a smart card that conforms to the specifications defined by the European Telecommunications Standards Institute ETSI Smart Card Platform project. A subscriber identification module (SIM) card is an example of a UICC. In one example, a host device is configured as a smart card reader. In one example, the host device is a payment terminal and the client device is a payment device, such as a payment card. In one example, the system 100 includes one or more computing entities 102 that are smart cards and one or more computing entities 102 that are smart card readers. For example, computing entity 102a and/or computing entity 102b may respectively be a smart card, and computing entity 102n may be a smart card reader.

In one example, a client device communicates with a host device via a contactless communication protocol. For example, computing entity 102a and computing entity 102b may communicate with one another via a contactless communication protocol. Additionally, or alternatively, computing entity 102n may communicate with computing entity 102a and/or computing entity 102b via a contactless communication protocol. Example contactless communication protocols include GSM communication protocols, CDMA communication protocols, UMTS communication protocols, LTE communication protocols, GPRS communication protocols, UMTS communication protocols, BGAN communication protocols, WLAN communication protocols, PAN communication protocols, LAN communication protocols, MAN communication protocols, WAN communication protocols, IoT communication protocols, or satellite communication protocols.

In one example, a host device includes a slot configured to receive a client device. For example, a client device configured as a payment card may be inserted into a slot of a host device configured as a payment terminal to communicatively couple the client device to the host device. As another example, a host device configured as a mobile communications device includes a slot configured to receive a client device configured as a SIM card that is insertable into the slot of the host device. For example, computing entity 102n may include a slot configured to receive computing entity 102a and/or computing entity 102b. The host device and the client device may communicate with one another via SIM card communication protocol, such as an ISO/IEC 7816 protocol, a TS 102 221 protocol, or a single wire protocol.

In yet another example, a client device is configured as an embedded SE or an eSIM card that is wired to a host device. For example, security module 104c may be an embedded SE or an eSIM card that is wired to computing entity 102c. Additionally, or alternatively, security module 104n may be an embedded SE or an eSIM card that is wired to computing entity 102n. The host device and the client device may communicate with one another via an embedded communication protocol, such as an ISO/IEC 7816 protocol, an ISO/IEC 14443 protocol, or a GSMA remote SIM provisioning protocol.

In yet another example, a client device is configured as an iSIM card that integrated into a host device. The host device may be a system-on-chip device. For example, security module 104c may be integrated into computing entity 102c. Additionally, or alternatively, security module 104n may be integrated into computing entity 102n. The host device and the client device may communicate with one another via an integrated communication protocol, such as an inter-integrated circuit protocol, a serial peripheral interface protocol, a universal asynchronous receiver/transmitter protocol, or an ISO/IEC 7816 protocol.

As further examples, a client device may be configured as at least one of: a payment card, an access control card, an identity card, an electronic passport, a security identification card, a health insurance card, a transportation card, a secure USB token, an internet-of-things device, a mobile telecommunications device. A host device may be configured to exchange information with one or more client devices described herein.

3. Example Digital Signature Algorithms

The computing entities described herein are configured to exchange digital signatures and/or digitally signed messages. To generate a digital signature for a message being transmitted from a sending computing entity to a recipient computing entity, the sending computing entity applies a hash function to the message to generate a message digest and then digitally signs the message digest using a digital signature algorithm. The digital signatures may be generated using one or more digital signature algorithms. In one example, a computing entity may select a digital signature algorithm from a set of digital signature algorithms. The digital signature algorithms may include one or more quantum-resistant digital signature algorithms, one or more legacy digital signature algorithms, or a combination of these.

A. Example Quantum-Resistant Digital Signature Algorithms

In one example, a digital signature algorithm includes a quantum-resistant digital signature algorithm. As used herein, the term "quantum-resistant" when used in connection with a digital signature algorithm, refers to a digital signature algorithm that is designed to resist attacks by quantum computing devices or systems.

Example quantum-resistant digital signature algorithms include: hash-based digital signature algorithms, multivariate quadratic-based digital signature algorithms, lattice-based digital signature algorithms, or zero-knowledge proof-based digital signature algorithms, as well as combinations of these.

Hash-based digital signature algorithms utilize cryptographic hash functions for generating digital signatures. The cryptographic hash functions in hash-based digital signature algorithms utilize tree structures to derive multiple one-time private keys that are used to generate digital signatures. Example hash-based digital signature algorithms include one-time hash-based digital signature algorithms, stateful hash-based digital signature algorithms, or stateless hash-based digital signature algorithms, as well as combinations of these.

One-time hash-based digital signature algorithms generate a digital signature based on a private key that is intended for one-time use. One-time hash-based digital signature algorithms may serve as building blocks for more complex digital signature algorithms. Example one-time hash-based digital signature algorithms include: Leighton-Micali One-Time Signature (LM-OTS) algorithms, Winternitz One-Time Signature (WOTS) algorithms, or Winternitz One-Time Signature Plus (WOTS+) algorithms.

Stateful digital signature algorithms utilize state information to manage utilization of private keys. Example stateful digital signature algorithms include: extended Merkle Signature Scheme (XMSS) algorithms, extended Merkle Signature Scheme Multi-Tree (XMSSMT) algorithms, Leighton-Micali Signature Scheme (LMS) algorithms, or LMS with short signature algorithms. Example stateful hash-based digital signature algorithms are further described in Cooper, et al., "Recommendation for Stateful Hash-Based Digital Signature Scheme," National Institute of Standards and Technology (NIST) Special Publication 800-208, Information Technology Laboratory, NIST, October 2020, available at https://doi.org/10.6028/NIST.SP.800-208, the entirety of which is hereby incorporated by reference. Example stateful hash-based digital signature algorithms are further described in Huelsing, et al., "XMSS: extended Merkle Signature Scheme," Internet Research Task Force (IRFT), Request for Comments No. 8391, May 2018 available at https://www.rfc-editor.org/rfc/pdfrfc/rfc8391.txt.pdf, the entirety of which is hereby incorporated by reference. Example stateful hash-based digital signature algorithms are further described in McGrew, et al., "Leighton-Micali Hash-Based Signatures," IRFT, Request for Comments No. 8554, April 2019, available at https://www.rfc-editor.org/rfc/pdfrfc/rfc8554.txt.pdf, the entirety of which is hereby incorporated by reference. Example stateful hash-based digital signature algorithms are further described in Fluhrer, et al., "Additional Parameter sets for HSS/LMS Hash-Based Signatures," Crypto Forum Research Group, Sep. 18, 2023, available at https://www.ietf.org/archive/id/draft-fluhrer-lms-more-parm-sets-11.html, the entirety of which is hereby incorporated by reference.

Stateless digital signature algorithms can be implemented without maintaining state information for managing utilization of private keys. Example stateless digital signature algorithms include: Stateless Practical Hash-Based Incredibly Nice Cryptographic Signature (SPHINCS+) algorithms, SPHINCS+Gravity algorithms, SPHINCS+ Korean algorithms, and NIST Stateless Digital Signature Algorithm (NIST SL-DSA) algorithms. Example stateless hash-based digital signature algorithms are further described in "Stateless Hash-Based Digital Signature Standard," Federal Information Processing Standards Publication 205, Information Technology Laboratory, NIST, Aug. 24, 2023, available at https://doi.org/10.6028/NIST.FIPS.205.ipd, the entirety of which is hereby incorporated by reference.

Multivariate quadratic-based digital signature algorithms generate digital signatures by transforming a message into a system of multivariate quadratic equations. The private key determines the specific transformation for generating the digital signature.

Lattice-based digital signature algorithms include cryptographic schemes that use operations within high-dimensional lattice structures to generate digital signatures. A digital signature is generated by performing certain transformations on a lattice using a private key, and the signature is verified using a public key derived from the lattice structure.

Zero-knowledge proof-based digital signature algorithms generate digital signatures through zero-knowledge proofs. To generate a digital signature based on a zero-knowledge proof, a private key is used to produce a proof that confirms the legitimacy of the signature, and the proof is validated using a public key. The zero-knowledge aspect ensures that even if the proof is observed, it does not expose the underlying private key or compromise the integrity of the signature.

B. Example Legacy Digital Signature Algorithms and Hash Functions

In one example, a digital signature algorithm includes a legacy digital signature algorithm. As used herein, the term "legacy," when used in connection with a digital signature algorithm, refers to a digital signature algorithm that is not specifically designed to resist attacks by quantum computing devices or systems. Legacy digital signature algorithms may include algorithms that have been in use for an extended period of time. A particular legacy digital signature algorithm may be suitable for some embodiments, for example, even if the particular legacy digital signature algorithm may have known limitations for vulnerabilities in the context of threats from quantum computing systems.

Example legacy digital signature algorithms include: Digital Signature Standard (DSA) algorithms, Rivest-Shamir-Adleman (RSA) algorithms, Elliptic Curve Digital Signature Algorithm (ECDSA) algorithms, Edwards-curve Digital Signature Algorithm (EdDSA) algorithms, or ElGamal algorithms.

C. Example Message Digest Hash Functions

The message digest that is digitally signed using the digital signature algorithm may be generated by applying one or more hash functions to the message. In one example, a computing entity may select a hash function from a set of hash functions. The hash functions may include one or more quantum-resistant hash functions, one or more legacy hash functions, or a combination of these. Example hash functions include: secure hash algorithms (e.g., SHA-1, SHA-2

(e.g., SHA-256 or SHA-512), or SHA-3), message digest algorithms (e.g., MD5), or RACE Integrity Primitives Evaluation Message Digest (RiPEMED-160).

4. EXAMPLE COMPUTING ENTITY ARCHITECTURE

Figure 2A:
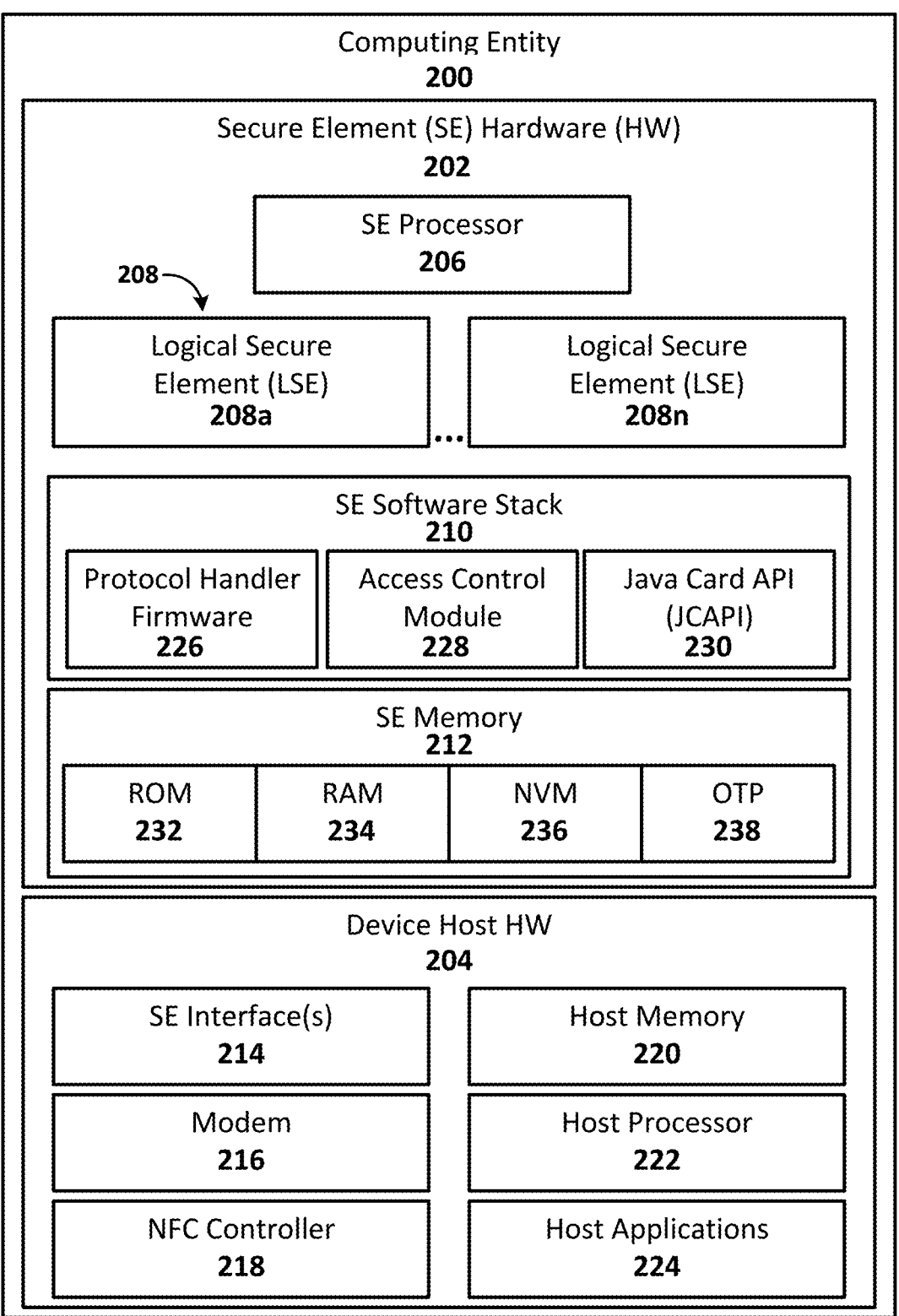
FIGS. 2A and 2B illustrate example architecture of a computing entity in accordance with one or more embodi-ments.
Figure 2B:
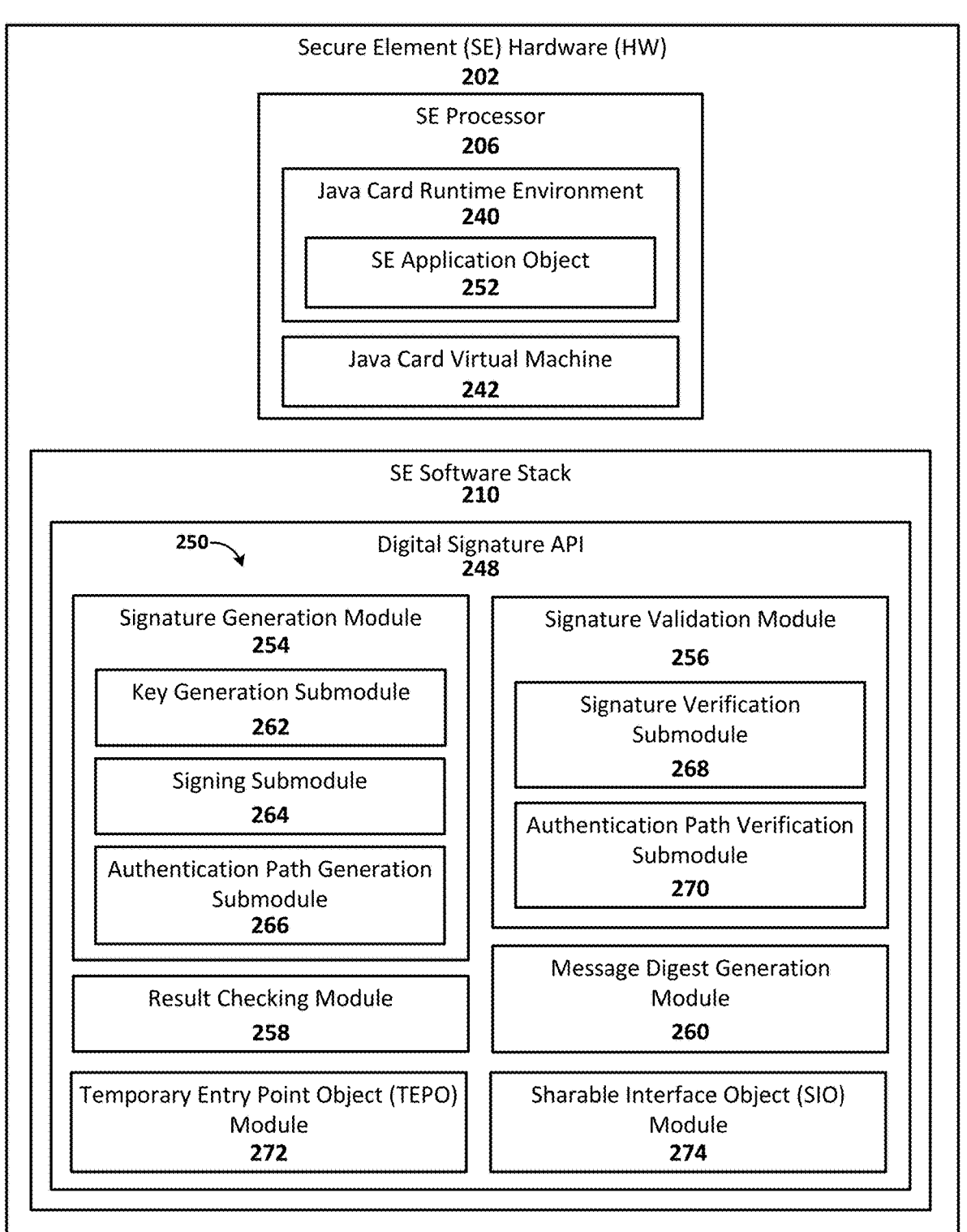

Referring now to FIGS. 2A and 2B, architecture of an example computing entity 200 is further described. In one example, the system 100 described with reference to FIGS. 1A and 1B may include one or more computing entities configured as described with reference to FIGS. 2A and 2B. A computing entity may include more or fewer components than the components illustrated in FIGS. 2A and 2B. In one example, one or more features of the system 100 described with reference to FIGS. 2A and 2B may be combined with one or more features of the '432 Application.

As shown in FIG. 2A, the system architecture of a computing entity 200 includes SE hardware 202 and device host hardware 204. SE hardware 202 includes SE processor 206 and a set of LSEs 208, such as LSE 208a and LSE 208n. The SE hardware 202 further includes an SE software stack 210, and an SE memory 212. The device host hardware 204 includes SE interface 214, modem 216, near-field communication (NFC) controller 218, host memory 220, and host processor 222. Device host hardware 204 may run host applications 224.

A. Secure Element Hardware and Device Host Hardware

In one example, SE hardware 202 may include a microprocessor-based chip that includes hardware components for protecting secure data from unauthorized access and for running secure applications. SE hardware 202 may include a smart card, such as a UICC (e.g., a SIM card). Additionally, or alternatively, SE hardware 202 may include other types of integrated circuit cards (ICCs) and tamper-resistant security chips for controlling access to secure resources.

In one example, the SE hardware 202 represents at least a portion of an SE platform. The SE platform may include the SE hardware 202 and at least one additional hardware component. An example SE platform is a Java Card platform. An SE platform, such as a Java Card platform, refers to an ecosystem or framework that enables the development, personalization, and/or execution of SE applications. An SE platform may include the SE hardware 202, the SE software stack 210, and other components utilized for deploying SE applications.

In one example, SE processor 206 is a microprocessor for executing an SE platform runtime environment and SE applications. An example SE platform runtime environment is Java Card Runtime Environment (JCRE). The JCRE provides a lightweight version of the Java Runtime Environment (JRE) that is tailored for smart cards and other tamper-resistant security chips to allow these SE hardware platforms to host SE applications, for example, employing Java technology. The SE processor and/or the JCRE may represent a portion of the SE platform. The JCRE may execute SE applications, for example, on the SE processor 206 and/or on one or more LSEs 208. The JCRE may provide an execution environment for the SE applications. The JCRE may execute operations associated with SE applications, including, for example, loading and unloading SE applications, scheduling SE application execution, isolation and security of SE applications, SE application memory management, and/or interactions between SE application and underlying hardware.

The SE platform runtime environment may be executed on at least one SE processor 206. The SE platform runtime environment may include instructions that, when executed by the at least one SE processor 206, cause performance of a set of digital signature operations. The digital signature operations may include digital signature operations associated with generating digital signatures for ensuring the authenticity, integrity, and/or non-repudiation of messages exchanged between the computing entity 200 and another computing entity. The digital signature operations may be performed by executing a set of one or more SE applications within the SE platform runtime environment. In one example, the digital signature operations include operations pertaining to generating digital signatures, for example, as described with reference to FIGS. 3A-3F. Additionally, or alternatively, digital signature operations may include operations pertaining to validating digital signatures, for example, as described with reference to FIGS. 4A-4H.

A hosted SE application within the JCRE may be referred to as an applet, or as a Java Card applet. The JCRE may include a firewall mechanism that isolates different applets on the smart card and a sharing mechanism that allows applets to explicitly make objects available to other applets. The JCRE may further include a Java Card Virtual Machine (JCVM) that runs bytecode, which is generated using a different encoding schema than the full JRE. Generally, the encoding schema of the JCRE reduces the memory footprint of an application to optimize for the application for execution by SE hardware 202, which generally includes more constraints than host hardware 204. For example, the size of SE memory 212 may be much smaller than host memory 220 and the speed of SE processor 206 may be much slower than host processor 222. Further, the native instruction set architecture (ISA) of SE processor 206 may be smaller or otherwise different than the ISA of host processor 222. One optimization technique to account for the constraints is to divide an application's code into packages below a size threshold and to restrict the packages that programming language constructs that are available within the environment. Although some examples described herein relate to the JCRE, embodiments described herein may be implemented by other runtime environments that execute on smart cards and other tamper-resistant chips.

SE hardware 202 runs multiple LSEs 208*a-n* that may operate as if multiple secure element chips have been installed within computing entity 200 from the perspective of a mobile device user. For example, LSEs 208*a-n* may operate as if multiple embedded and/or removable SIM cards were currently operating within computing entity 200. Thus, LSEs 208*a-n* may correspond to virtual SIM cards and/or other tamper-resistant chips that share and are run from the same SE hardware components. SE hardware 202 and/or firmware running therein may enforce isolation between different LSEs to prevent one LSE from accessing the applets and code of another LSE. The isolation mechanism may be separate and distinct from the firewall mechanism of the JCRE previously mentioned. The firewall mechanism may be applied to a given LSE to maintain separation between different applets that are installed on the same LSE. The isolation mechanism may be implemented at a lower level to maintain isolation between different LSEs, each of which may be configured with their own firewalls.

The SE software stack 210 may include a set of components used to execute SE applications. SE software stack 210 may include code, referred to herein as SESS-code, that executes applets and provides a runtime environment for the applets. In some embodiments, the SE software stack 210 may include protocol handler firmware 226, an access control module 228, and a Java Card API (JCAPI) 230.

Additionally, or alternatively, the SE software stack 210 may include other components, such as a JCVM, other APIs, and/or other components of the JCRE for hosting Java Card applications. The JCAPI may include a set of software libraries, classes, and/or methods provided by the SE platform. SE applications may use the JCAPI to interact with underlying components of the SE hardware 202 to execute various functionalities. In some embodiments, the SESS-code is distinct from the code of applets and LSE applications. SESS-code provides a program and runtime environment for executing the LSE application code. For instance, the SESS-code may provide a virtual machine that runs applets. Additionally, or alternatively, the SESS-code may manage access to the SE hardware components, such as crypto accelerators and memory segments, and/or perform memory management operations including allocating runtime memory for an applet that is currently running within the runtime environment. The SESS-code may be common to LSEs 208*a-n* to optimize for size and reduce processing overhead.

In some embodiments, protocol handler firmware 226 is low-level firmware that is used by SESS-code to manage operations targeting LSEs 208*a-n*. In the case of a Java Card based secure element, protocol handler firmware 226 may be part of the JCRE. However, the firmware may be integrated into other runtime environments or in a standalone manner, depending on the particular implementation.

In some embodiments, protocol handler firmware 226 manages routing messages received from device host hardware 204 to the targeted LSE. When routing messages, protocol handler firmware 226 may trigger a switch operation to change which LSE is currently active and running on SE hardware 202.

Access control module 228 provides authentication to prevent unauthorized entities from triggering changes between LSEs and/or other operations that access LSE data. Access control module 228 may be a component of protocol handler firmware 226 or may be a separate component, depending on the particular implementation. Access control module 228 may block requested operations if the message is not successfully verified as having originated from an entity authorized to trigger the requested operation.

SE memory 212 may include one or more types of volatile and/or non-volatile storage such as read-only memory (ROM) 232, random-access memory (RAM) 234, non-volatile memory (NVM) 236, and one-time programmable (OTP) memory 238. SE memory 212 may store the data in an encrypted format. As described further below, the encryption scheme, such as the encryption algorithm and/or key location, may vary between different LSEs to provide data integrity and isolation. In some embodiments, SE memory 212 securely stores data for LSEs 208*a-n*.

In some embodiments, switch commands and other messages originate from device host hardware 204. For example, messages may be received wirelessly through modem 216 and/or NFC controller 218. The messages may be routed to SE hardware 202 by SE interface 214. SE interface 214 may convert the messages received wirelessly to a format that is consumable by protocol handler firmware 226. Additionally, or alternatively, SE interface may include a bus or other communication system for transferring messages from device host hardware 204 to SE hardware 202.

In some embodiments, modem 216 is a mobile broadband modem that sends and receives messages via a mobile broadband connection. For example, carriers, including mobile network operators (MNOs) and mobile virtual network operators (MVNOs), may send network messages to a mobile phone wirelessly through modem 216 via a cellular network. Different LSEs may be targeted based on which mobile phone operator sent the message. SE hardware 202 may support multiple virtual SIM cards from different mobile phone operators. Additionally, or alternatively, other messages received wirelessly through modem 216 may target different types of LSEs. Example LSE applications may include payment processing, biometric authentication, identity management, and mobile network communications.

In some embodiments, NFC controller 218 receives near-field wireless messages from external devices. NFC communications may transmit data through inductive coupling between an antenna in NFC controller 218 and the external device when placed within a threshold distance. An NFC message may trigger an operation in an LSE. For example, a payment terminal may generate an NFC message to extract credit card information and/or other data during a transaction. The target LSE may securely store financial information of a mobile device user and include one or more applets for processing secure transactions initiated with a payment terminal. NFC messages may trigger other operations, which may vary depending on the type of LSE application and SSP associated with the application.

Additionally, or alternatively, device host hardware 204 may include other components for receiving messages through wired or wireless interfaces. For example, device host hardware 204 may include a Bluetooth module, a Zigbee chip, a Wi-Fi card, an infrared receiver, a universal serial bus (USB) controller, and/or a serial communications interface. Messages received through such hardware components may serve as external triggers that initiate operations to switch between LSEs 208*a-n* and access resources that have been mapped to the LSE.

Device host hardware 204 may further include host memory 220 and host processor 222 for executing host applications 224. For example, a smartphone may include a mobile processor and RAM for executing a mobile operating system and mobile phone applications. Host processor 222 and host memory 220 may be physically separate from SE hardware 202 to protect against attacks if the security of computing entity 200 is compromised. SE hardware 202 may prevent host processor 222 from accessing secure data stored in SE memory 212. Requests to access the data may be routed through protocol handler firmware 226.

In other embodiments, device host hardware 204 may include additional or fewer components. For example, some devices, such as smart credit cards and company badges, may not include a mobile processor, CPU, or memory external to the secure element. These devices may not execute applications other than the applets hosted by SE hardware 202. Thus, the architecture of device host hardware 204 may vary depending on the particular type of device in which SE hardware 202 is integrated.

Referring now to FIG. 2B, example configurations of a SE hardware 202 are further described. As shown in FIG. 2B, the SE hardware may include an SE processor 206 that may execute a JCRE 240 and a JCVM 242. The JCRE 240 and/or the JCVM 242 may be implemented as firmware. The JCRE 240 and the JCVM 242 may work in tandem to provide a secure and controlled environment for executing SE applications. The JCRE 240 may interact with the underlying components of the SE hardware 202 to manage the execution of SE applications. The JCRE 240 may provide features to support execution of SE applications, including memory management, security mechanisms, loading and unloading of SE applications, and/or scheduling execution of SE applications. The JCVM 242 may execute bytecode instructions of the SE applications.

B. Digital Signature API

As further shown in FIG. 2B, the SE hardware 202 may include a SE software stack 210 that includes a digital signature API 248. The digital signature API 248 may include a set of one or more digital signature modules 250 that one or more SE applications may use to execute digital signature operations. Various parameters utilized by the set of one or more digital signature modules 250 may be configured, for example, based on one or more user inputs and/or based on a selected mode of operation. One or more digital signature modules of the digital signature API 248 may be executed by an SE application within the JCRE 240 and/or within an LSEs 208 (FIG. 2A). In one example, a set of digital signature operations may be performed by executing one or more SE applications within the JCRE 240. As shown in FIG. 2B, the digital signature API 248 may initialize an SE application object 252 within the JCRE 240. The SE application object 252 may include an SE application configured to execute one or more digital signature modules 250 within the JCRE 240. The SE application object 252 may import one or more of the digital signature modules 250 from the digital signature API 248 to access and execute the one or more of the digital signature modules 250 in the JCRE 240. Additionally, or alternatively, a set of digital signature operations may be performed by executing one or more SE applications within a particular LSE 208. In one example, the SE application object 252 may instruct a particular SE application within a particular LSE 208 to import one or more digital signature modules 250 and to execute the one or more digital signature modules 250 within the particular LSE 208. The SE application object 252 may access one or more digital signature modules 250 of the digital signature API 248, and the one or more digital signature modules 250 may be executed by an SE application, such as within an LSEs 208.

As shown in FIG. 2B, the set of one or more digital signature modules 250 may include at least one of: a signature generation module 254, a signature validation module 256, a result checking module 258, or a message digest generation module 260. The signature generation module 254 includes operations that may be executed by an SE application object to generate digital signatures. The signature validation module 256 includes operations that may be executed by an SE application object to validate digital signatures. The result checking module 258 includes operations that may be executed by an SE application object to check results generated by digital signature operations. The message digest generation module 260 includes operations that may be executed by an SE application object to generate and/or identify a message digest of a message for use in digital signature operations.

The signature generation module 254 may include one or more of: a key generation submodule 262, a signing submodule 264, or an authentication path generation submodule 266. The key generation submodule 262 includes operations that may be executed by an SE application object to generate private keys, public keys, and/or key pairs for use in digital signature operations. The key pairs may include one-time key pairs for use in accordance with a hash-based signature protocol. The signing submodule 264 includes operations that may be executed by an SE application object to utilize a private key of a key pair to generate a digital signature by executing a signature generation algorithm in accordance with a digital signature protocol. The authentication path generation submodule 266 includes operations that may be executed by an SE application object to generate an authentication path corresponding to a key pair utilized for a digital signature.

In one example, the hash-based signature protocol utilizes a set of one-time key pairs. A particular one-time key pair is utilized once to generate a digital signature. The key generation submodule 262 includes operations for tracking utilization of the one-time key pairs, for example, to identify a particular one-time key pair to be utilized for a particular digital signature, to ensure that the particular one-time key pair is utilized once and is not reutilized, and/or to determine whether the set of one-time key pairs has an additional one-time key pair or whether the one-time key pairs have been fully utilized. The set of one-time key pairs are associated, respectively, with a set of leaf nodes of a tree structure. A particular one-time key pair is associated with a particular leaf node of the tree structure. In one example, a particular leaf node, of the set of nodes, include a particular public key of a particular one-time key pair. Additionally, or alternatively, a particular leaf node, of the set of nodes, include a hash value corresponding to a particular public key. The tree structure includes a root node. A root public key, or a hash value corresponding to the root public key, is associated with the root node of the tree structure. The authentication path includes a sequence of hash values associated, respectively, with node of the tree structure that are utilized to recompute the root public key. The authentication path generation submodule 266 includes operations that may be executed to determine the sequence of hash values of the authentication path. The authentication path allows a recipient of a digital signature to verify that a one-time key pair utilized for the digital signature is associated with a leaf node of a tree structure that is rooted at the root public key. The root public key is a hash value that represents the tree structure. The tree structure includes a set of intermediate nodes that include a set of children nodes. An intermediate hash value associated with an intermediate node is computed by executing a hash function on a concatenation of the set of children nodes of the intermediate node.

In one example, the tree structure is defined by a set of parameters associated with a digital signature protocol. The parameter set may be maintained in persistent memory of the SE hardware 202 (FIG. 2A). The parameter set may include one or more of the following: a hash length, a hash function, a public key seed, a private key seed, a Winternitz parameter, a height of the tree structure, or a number of layers or subtrees in the tree structure. The hash length may define a length of one or more of the following: digital signature elements, public keys, private keys, or hash values corresponding to nodes of the tree structure. The hash function may be utilized to compute node values of the tree structure. The public seed may be utilized to generate pseudorandom values for the tree structure. The private seed may be utilized to generate private keys for the one-time key pairs. The Winternitz parameter is a parameter that balances a trade-off between signature size and computational efficiency. The total number of leaf nodes of the tree structure is based on the height of the tree structure. The tree structure may include one or more layers or subtrees. In one example, an XMSS algorithm utilizes a single tree structure. In one example, an XMSSMT algorithm utilizes multiple tree structures.

The signing submodule 264 may implement a digital signature protocol that includes one or more digital signature algorithms. The digital signature protocol may include a hash-based signature protocol that includes one or more hash-based digital signature algorithms. The hash-based signature protocol may include a stateful hash-based signature protocol, a stateless hash-based signature protocol, or a one-time hash-based signature protocol. A stateful hash-based signature protocol may include one or more stateful hash-based digital signature algorithms. A stateless hash-based signature protocol may include one or more stateless hash-based digital signature algorithms. A one-time hash-based signature protocol may include one or more one-time hash-based digital signature algorithms. The particular digital signature protocol may be selected from among a set of digital signature protocol. Additionally, or alternatively, the particular digital signature algorithms included in a digital signature protocol may be selected from among a set of digital signature algorithms. Example digital signature algorithms are further described above in Section 3, titled "Example Digital Signature Algorithms."

One or more digital signature protocol and/or one or more digital signature algorithms may be incorporated into the signature generation module 254. The one or more digital signature protocols and/or the one or more digital signature algorithms may be accessed and utilized by the SE application object 252 to execute digital signature operations. Additionally, or alternatively, the SE application object 252 may cause different digital signature operations to be executed by various applets, for example, within one or more LSEs 208.

The signature validation module 256 may include a signature verification submodule 268 and/or an authentication path verification submodule 270. The signature verification submodule 268 includes operation for verifying a digital signature. The operations for verifying the digital signature may include operations for computing a verification artifact by applying to the digital signature a verification protocol corresponding to the digital signature protocol utilized to generate the digital signature. The authentication path verification submodule 270 includes operation for verifying authentication path. The operations for verifying the authentication path may include operations for computing a root hash value corresponding to a root of a tree structure corresponding the digital signature protocol utilized to generate the digital signature.

The message digest generation module 260 may include operations that may be executed by an SE application object to generate a message digest for a message. Additionally, or alternatively, the message digest generation module 260 may include operations that may be executed by an SE application object to receive a message digest generated outside of the SE platform runtime environment. A message digest may include a fixed-size numerical representation of the contents of a message. The message digest is generated by applying a hash function to the message. In one example, the message digest is digitally signed rather than the message itself to reduce the computational overhead and/or to ensure that digital signatures have a fixed length. Additionally, or alternatively, messages may be digitally signed, for example, when the contents of the messages are relatively small.

In one example, the result checking module 258 executes one or more result checking operations upon results of one or more digital signature operations. In one example, a result checking operation may include determining that a result of a particular digital signature operation has a length that meets one or more criteria. The one or more criteria may include at least one of: an upper length threshold, a lower length threshold, a length range, or a length value. The result checking module 258 may determine an occurrence of a security vulnerability and/or a data processing error when the result of the particular digital signature operation fails to meets the one or more criteria. In one example, the result checking operation verifies that a length of a hash value generated by a digital signature operation matches a length specified in a parameter set. The length of the hash value generated by the digital signature may depend on the digital signature protocol utilized to generate the hash value. The hash value checked by the result checking operation may include a public key, a private key, a digital signature, or a node of the tree structure.

In one example, the digital signature API 248 includes a temporary entry point object (TEPO) module 272. The TEPO module may generate a transient object handle. A transient object handle may serve as a reference or pointer to an object stored in transient memory. The transient object handle may provide temporary access and use of an object stored in non-persistent, or transient, memory. In one example, an SE application object 252 may call the TEPO module 272 to generate a transient object handle that points to an object utilized by the SE application object 252 in a digital signature operation. The TEPO module 272 may be utilized to avoid persistent memory writes of data pertaining to digital signature operations. In one example, a transient object handle may point to an output of a first digital signature operation that is utilized as an input for a second digital signature operation. In one example, the TEPO module may generate transient object handles for use in an incremental hashing process utilized to generate and/or verify digital signatures. A transient object handle may point to a first segment that is stored in transient memory after having been generated by the incremental hashing process. The first segment may be combined with a second segment, for example by accessing the first segment from the transient memory via the transient object handle. In one example, the TEPO module may generate transient object handles for use in generating an authentication path. A transient object handle may point to a first hash value of an authentication path that is stored in transient memory after having been generated by the authentication path generation submodule 266. The authentication path generation submodule 266 may access the first hash value via the transient object handle to combine with a second hash value of the authentication path. Additionally, or alternatively, the TEPO module may generate transient object handles for use in verifying an authentication path. A transient object handle may point to a first intermediate hash value that is stored in transient memory after having been generated by the authentication path verification submodule 270. The authentication path verification submodule 270 may access the first intermediate hash value via the transient object handle for use in generating a next intermediate hash value. By using the TEPO module 272 to generate transient object handles, the SE platform runtime environment ensures that it can read and manipulate objects in transient memory without writing changes back to the persistent memory. This avoids unnecessary writes to the persistent memory, which improves security and efficiency of the digital signature operations.

In one example, the digital signature API 248 may include a shareable interface object (SIO) module 274. An SIO module 274 may be executable to generate one or more SIOs that facilitate secure communication and interaction between different SE applications. The respective SE applications may be logically isolated, for example, within an LSE 208, to prevent unauthorized access to respective data and/or functions. An SIO provides a controlled mechanism to share data and functionality across SE applications without violating isolation protocols. Access to an SIO may be subject to an access control mechanisms defined in the SE platform. According to the access control mechanism, an SE applications may be required to have appropriate permissions to access and use an SIO.

In one example, the various parameters may be configured for use by one or more of the digital signature modules 250 may include selection of the particular algorithm(s) utilized by one or more of the digital signature modules 250. In one example, the particular algorithm(s) to be utilized by the one or more digital signature modules 250 may be determined based on a mode of operation passed to the digital signature API 248. Additionally, the private keys and public keys to be utilized by various digital signature modules 250 of the digital signature API 248 may be passed to the various digital signature modules 250 of the digital signature API 248 in "raw" format, such as in the form of a byte array, thereby allowing the keys to be transferred directly into operations executed by the various digital signature modules 250 of the digital signature API 248. Additionally, or alternatively, a random data generation object may be passed to the digital signature API 248.

5. EXAMPLE DIGITAL SIGNATURE OPERATIONS

Referring now to FIGS. 3A-3F and 4A-4H, example operations pertaining to generating and validating digital signatures are described. Example operations pertaining to generating digital signatures are described with reference to FIGS. 3A-3F. Example operations pertaining to validating digital signatures are described with reference to FIGS. 4A-4H. The operations described with reference to FIGS. 3A-3F and 4A-4H may be executed with one or more components of the system 100 described with reference to FIG. 1 and/or with one or more components of the computing entity 200 described with reference to FIGS. 2A and 2B.

For example, the operations may be executed in an SE platform runtime environment, such as in one or more LSEs of the SE platform runtime environment. One or more operations described with reference to FIGS. 3A-3F and 4A-4H may be modified, rearranged, or omitted all together. Accordingly, the particular sequence of operations described with reference to FIGS. 3A-3F and 4A-4H should not be construed as limiting the scope of one or more embodiments. In one example, one or more operations described with reference to FIGS. 3A-3F and 4A-4H may be combined with one or more operations described with reference to the '432 Application.

A. Example Signature Generation Operations

Figure 3A:
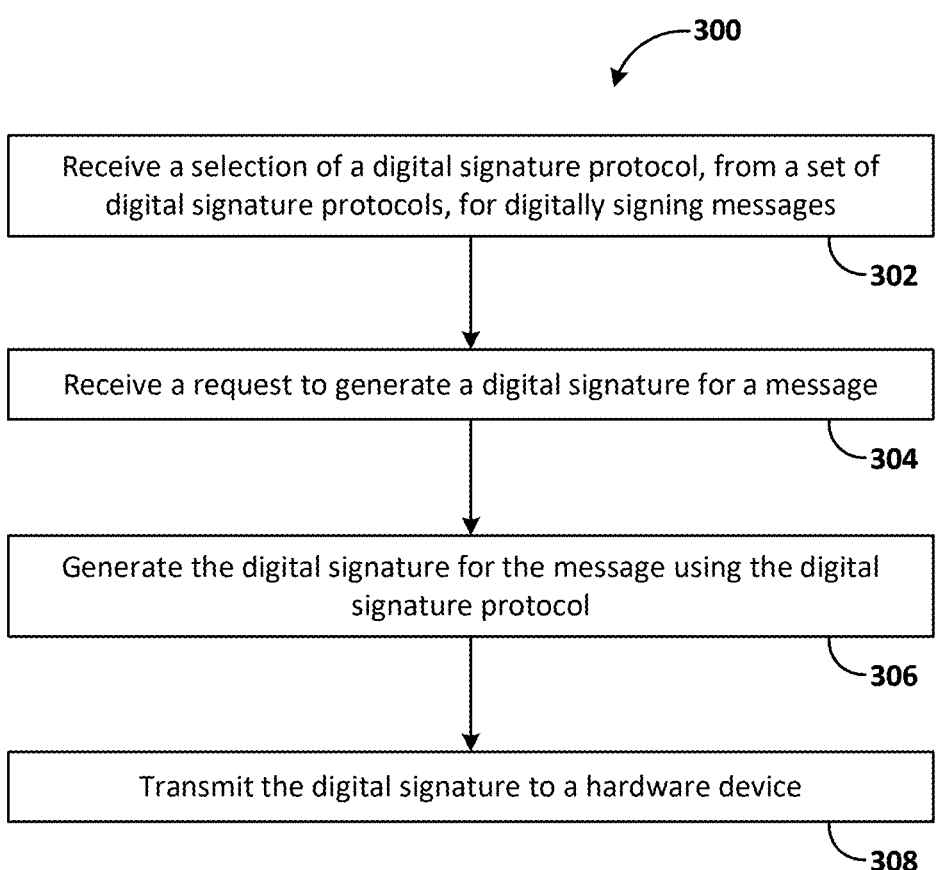

Referring to FIGS. 3A-3F, example signature generation operations 300 are further described. As shown in FIG. 3A, a system receives a selection of a digital signature protocol, from a set of digital signature protocols, for digitally signing messages (Operation 302). The digital signature protocol may be a hash-based digital signature protocol. The digital signature protocol may be selected based on an input from a computing entity. The input from the computing entity may include an input from an input device representing a selection by a user. The system may receive the selection via an SE interface. Additionally, or alternatively, the digital signature protocol may be selected based on one or more parameters associated with the computing entity, such as one or more parameters associated with the SE platform runtime environment.

Additionally, or alternatively, the system receives a request to generate a digital signature for a message (Operation 304). The request to generate the digital signature may be based on an input from a computing entity. The input from the computing entity may include an input from an input device representing an input by a user. The system may receive the request via an SE interface. Additionally, or alternatively, the request may be initiated based on one or more operations associated with the computing entity, such as one or more operations associated with the SE platform runtime environment. In one example, the request to generate the digital signature may be generated in connection with generation and/or receipt of the message.

Responsive at least in part to the request, the system generates the digital signature for the message using the digital signature protocol (Operation 306). Operations pertaining to generation of the digital signature are described further below with reference to FIGS. 3B-3F. Upon having generated the digital signature, the system transmits the digital signature to a hardware device (Operation 308). In one example, the system transmits the digital signature from a first portion to a second portion of the computing entity that generated the digital signature. For example, the system may transmit the digital signature from SE hardware to device host hardware. Additionally, or alternatively, the system may transmit the digital signature from a first computing entity to a second computing entity. The first computing entity and the second computing entity may represent different devices and/or different components of the same device. In one example, the system transmits the digital signature to a computing entity that validates the digital signature, for example, in accordance with one or more signature validation operations described with reference to FIGS. 4A-4H.

i. Generating Digital Signatures

Referring to FIG. 3B, operations 300 pertaining to generating digital signatures are further described. In one example, one or more of the operations described with reference to FIG. 3B may be included in operation 306 described with reference to FIG. 3A. As shown in FIG. 3B, to generate a digital signature, the system initializes at least one SE application object in an SE platform runtime environment (Operation 310). The system may utilize a digital signature API to initialize one or more SE application objects. An SE application object initialized in the SE platform runtime environment includes a signature generation element for generating digital signatures. The SE application object is executed in the SE platform runtime environment to perform one or more digital signature operations for generating a digital signature. The digital signature may be a hash-based digital signature. The system may utilize a particular SE application object to perform multiple digital signature operations. Additionally, or alternatively, the system may utilize multiple SE application objects to perform different digital signature operations.

The system obtains, via an SE application object, a message digest to be digitally signed (Operation 312). The message digest is a fixed-size, numerical representation (hash) of the contents of a message. The message digest is generated by applying a hash function to the message. In one example, the message digest is generated outside of the SE platform runtime environment. In one example, a computing entity includes SE hardware and device host hardware. The message digest may be generated by the device host hardware and transmitted to the SE hardware. Additionally, or alternatively, the SE application object may generate the message digest. The message digest may be stored in persistent or transient memory of the SE hardware. The SE application object may identify and access the message digest based on commands from a digital signature API. The commands may be provided in the form of application protocol data units (APDUs). In one example, the system identifies and accesses the message digest based on one or more commands, such as APDUs, from a signature generation module of the digital signature API. Based on the one or more commands, the system extracts specific bytes or segments from a command buffer such as an application protocol data unit (APDU) buffer. Additionally, or alternatively, the system may access the message digest based on object fields or arrays identified by indices or parameters of the signature generation module of the digital signature API.

In one example, the

The system determines, via the SE application object, a digital signature protocol for generating a digital signature for the message digest (Operation 314). The digital signature protocol may include a hash-based signature protocol. The SE application object determines the digital signature protocol based on commands from the digital signature API, such as from the signature generation module of the digital signature API. The commands may be provided in the form of APDUs. The commands may include specific instructions that specify the digital signature protocol to be utilized. Based on the one or more commands, the system follows the digital signature protocol when executing the digital signature operations, thereby ensuring that the correct operations are executed in accordance with the particular digital signature protocol.

In one example, prior to executing operations in accordance with a particular digital signature protocol, the system verifies that the digital signature protocol is supported by the digital signature API. The system may determine whether a digital signature protocol is supported by comparing the digital signature protocol against a list of supported digital signature protocols. When the system determines that the digital signature protocol is supported, the system proceeds with execution of the digital signature operations to generate the digital signature in accordance with the digital signature protocol. When the system determines that the digital signature protocol is unsupported, the system may throw an error or generate an error message. Additionally, or alternatively, the system may initiate a set of operations to add the unsupported digital signature protocol to the set of supported digital signature protocols.

Upon having determined the digital signature protocol for generating the digital signature, the system determines, via the SE application object, a key pair that includes a private key and a public key for use in generating the digital signature in accordance with the digital signature protocol (Operation 316). In one example, the system utilizes the SE application object to identify a key pair that has already been generated for the digital signature to be generated. In one example, the system utilizes a first SE application object to generate the key pair and a second SE application object to generate the digital signature. In one example, the key pair is a one-time key pair corresponding to a tree structure associated with a hash-based signature protocol. Operations pertaining to generating key pairs are further described below with reference to FIG. 3C.

Upon having determined the key pair for use in generating the digital signature, the system generates, via the SE application object, an authentication path corresponding to the key pair (Operation 318). The authentication path includes a sequence of hash values associated, respectively, with nodes of the tree structure that are utilized to recompute a root public key, or a root hash value, corresponding to a root node of the tree structure. The authentication path includes the public key corresponding to the key pair for use in generating the digital signature. The public key corresponds to a first leaf node of a tree structure defined in accordance with the hash-based signature protocol Additionally, the authentication path includes a hash value corresponding to a second leaf node that is a sibling node of the first leaf node. Additionally, the authentication path includes a set of one or more hash values corresponding to a set of one or more intermediate nodes of the tree structure. The root public key, or the root hash value, is computable based on the authentication path. Operations pertaining to generating the authentication path are further described below with reference to FIG. 3D.

Upon having determined the key pair for use in generating the digital signature, and/or upon having generated the authentication path corresponding to the key pair, the system utilizes the SE application object to generate the digital signature for the message. (Operation 320). To generate the digital signature, the system utilizes the private key of the key pair to execute a signature generation algorithm upon the message digest in accordance with the digital signature protocol. Operations pertaining to generating digital signatures are further described below with reference to FIGS. 3E and 3F.

ii. Generating Key Pairs

Figure 3C:
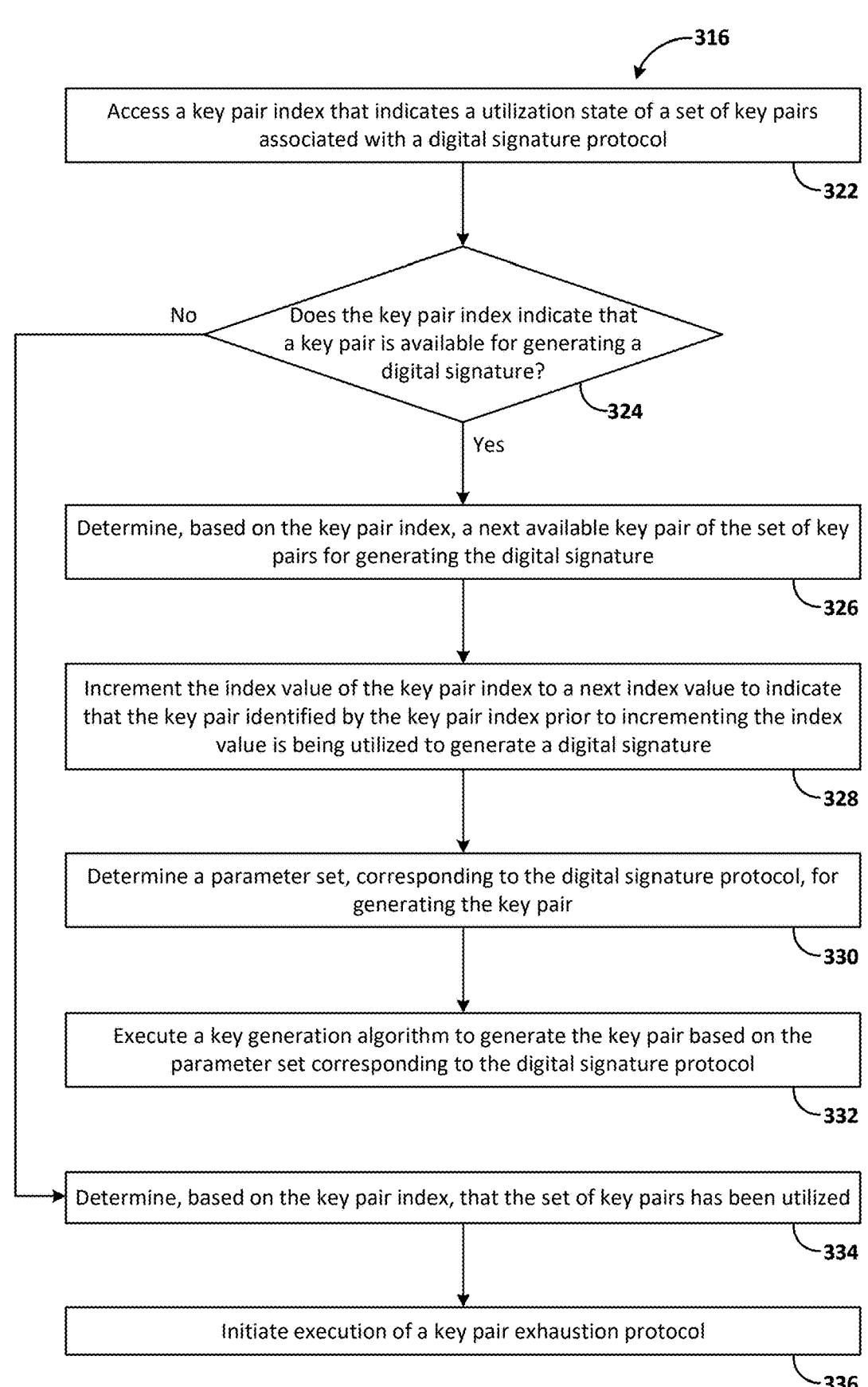

Referring to FIG. 3C, operations 300 pertaining to generating key pairs for use in digital signature operations are further described. In one example, one or more of the operations described with reference to FIG. 3C may be included in operation 316 described with reference to FIG. 3B. As shown in FIG. 3C, to generate a key pair, the system accesses a key pair index that indicates a utilization state of a set of key pairs associated with a digital signature protocol (Operation 322). The key pair index may include an index value that identifies a next available key pair of the set of key pairs. In one example, the key pair index identifies a leaf node of a tree structure associated with a hash-based signature protocol. The system may generate the key pair corresponding to the leaf node based on the key pair index. As key pairs are utilized, the system may increment the index value to indicate the next available key pair and/or the leaf node of the key structure corresponding to the next available key pair. When the system utilizes the key pair to generate a digital signature, the system may include the index value with the digital signature. The index value may be appended to the digital signature or provided separately in association with the digital signature. When the system transmits the digital signature and the index value to a recipient computing entity for verification, the recipient computing entity utilizes the index value to retrieve a public key for use in verifying the digital signature.

The system determines whether the key pair index indicates that a key pair is available for generating a digital signature (Operation 324). In one example, the key pair index may include a value that specifies whether a key pair is available. In one example, the set of key pairs may include (N) number of key pairs that correspond, respectively, (N) number of leaf nodes of a tree structure. An index value, (V), of the key pair index may indicate whether a key pair is available. When a key pair is available, the index value (V) is less than (N). When a key pair is unavailable, for example, because the set of key pairs have been utilized, the index value (V) equals the number of key pairs (N).

When the system determines, based on the key pair index, that a key pair is available for generating a digital signature, the system determines a next available key pair of the set of key pairs (Operation 326). In one example, the system determines the index value (V) of the key pair index and based on the index value (V), the system determines a leaf node of the tree structure that identifies the next available key pair. Additionally, the system increments the index value (V) of the key pair index to a next index value (V+1) to indicate that the next available key pair is being utilized to generate the digital signature (Operation 328).

The system determines a parameter set, corresponding to the digital signature protocol, for generating the key pair (Operation 330). The parameter set may include one or more parameters for generating the key pair. The parameters may include one or more of the following: a hash length, a hash function, a public key seed, a private key seed, a Winternitz parameter, a height of the tree structure, or a number of layers or subtrees in the tree structure. The system may access the parameter set in persistent memory of the SE hardware. The system may access the parameter set based on commands, such as APDUs, from a key generation module of the digital signature API. Based on the one or more commands, the system may access the parameter set by extracting specific bytes or segments from a command buffer such as an APDU buffer. Additionally, or alternatively, the system may access the access the parameter set based on object fields or arrays identified by the key generation module of the digital signature API.

Upon having accessed the parameter set corresponding to the digital signature protocol, the system executes a key generation algorithm to generate the key pair (Operation 332). To generate the key pair, the system generates a private key and a public key. The private key is generated based on a private key seed and the public key is generated based on a public key seed. The public key seed and the private key seed are generated based on a master seed. The system may generate the private key of the key pair by applying a pseudorandom function to the private key seed to generate a pseudorandom seed and then applying a hash function to the pseudorandom seed. The system may generate the public key of the key pair by applying a pseudorandom function to the public key seed to generate a pseudorandom seed and then applying a hash function to the pseudorandom seed. The pseudorandom function for generating the pseudorandom seed may include a keyed hash function or a cryptographic key derivation function. An example keyed hash function is a hash-based message authentication code (HMAC) function. An example cryptographic key derivation function is a HMAC-based key derivation function (HKDF). The hash function applied to the pseudorandom seed may include a secure hash algorithm or other hash algorithm described above.

The system generates metadata that associates the key pair with the leaf node of the tree structure. The metadata may identify the leaf node by a node number or an index number.

The metadata may be embedded in the public key and the private key. Additionally, or alternatively, the metadata may be stored in association with public key and the private key. The metadata ensures that the private key can be utilized once to generate a digital signature associated with the leaf node and that the public key can be utilized to verify the digital signature.

Referring again to operation 324, when the system determines, based on the key pair index, that a key pair is not available for generating a digital signature, the system determines that the set of key pairs has been utilized (Operation 334). In response to determining that the set of key pairs has been utilized, the system initiates execution of a key pair exhaustion protocol (Operation 336). In one example, the key pair exhaustion protocol includes throwing an exception that indicates that the set of key pairs has been utilized and/or that a key pair is unavailable for generating the digital signature. Additionally, or alternatively, the key pair exhaustion protocol may include generating or obtaining a new master seed, a new private seed, and/or a new public seed, for use in generating a new set of key pairs. The system may generate a master seed based on one a physical randomness source and/or a pseudorandom number generator.

iii. Generating Authentication Paths

Figure 3D:
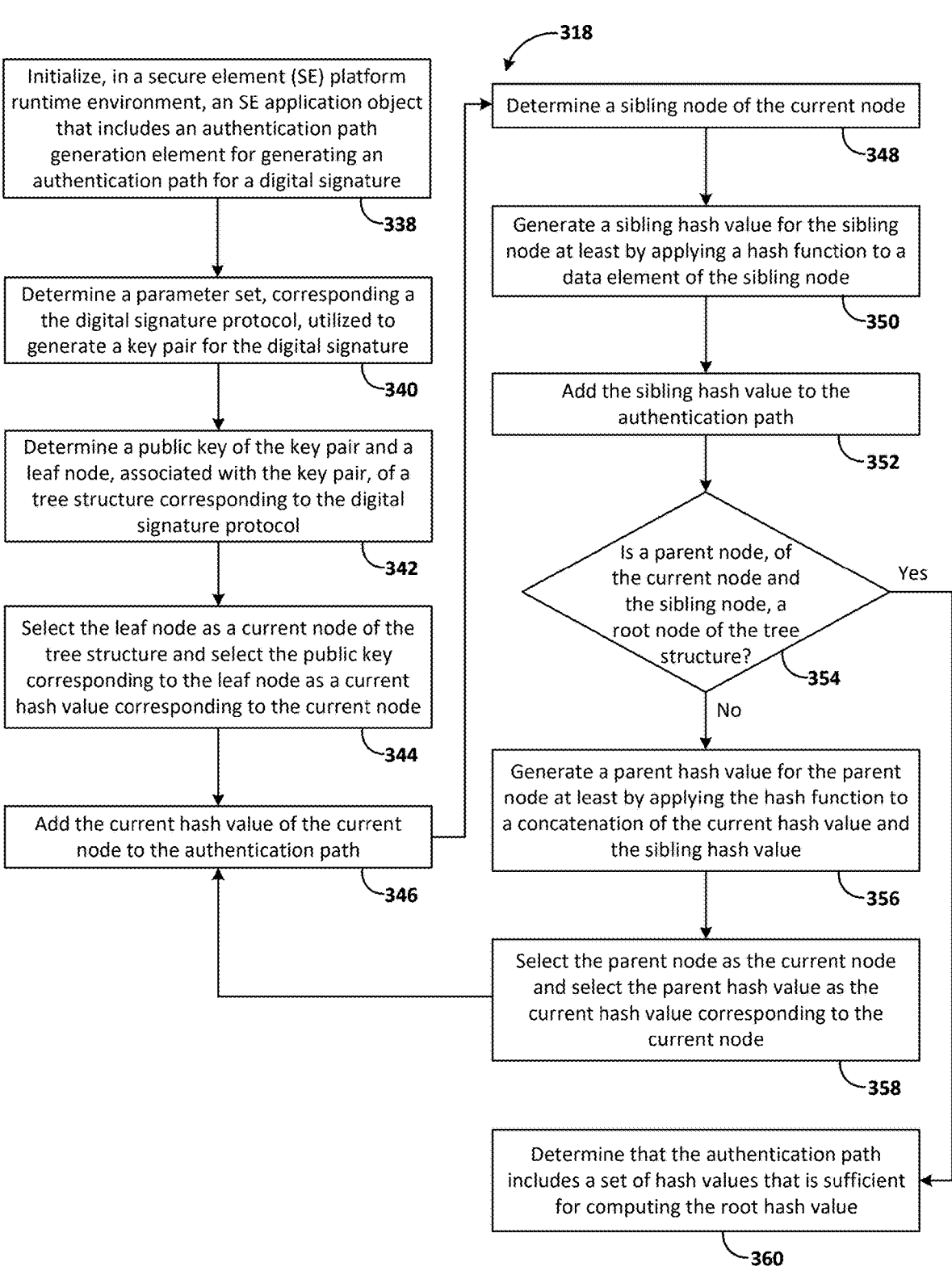

Referring to FIG. 3D, operations 300 pertaining to generating authentication paths corresponding to key pairs utilized for generating and authenticating digital signatures are further described. In one example, one or more of the operations described with reference to FIG. 3D may be included in operation 318 described with reference to FIG. 3B. As shown in FIG. 3D, to generate an authentication path, the system initializes, in an SE platform runtime environment, an SE application object that includes an authentication path generation element for generating an authentication path for a digital signature (Operation 338). The SE application object is executed in the SE platform runtime environment to perform one or more digital signature operations for generating an authentication path. The system may utilize the same SE application object utilized to generate the authentication path, the key pair, and the digital signature. Alternatively, the system may utilize a first SE application object to generate the authentication path and at least a second SE application object to generate the key pair and the digital signature.

The system determines a parameter set, corresponding to the digital signature protocol, that was utilized to generate a key pair for the digital signature (Operation 340). The parameter set may include at least a portion of the parameters utilized to generate the key pair as described above with reference to FIG. 3C. In one example, the parameter set includes one or more parameters that define at least a portion of a tree structure corresponding to the digital signature protocol. In one example, the parameter set includes a height of the tree structure and/or a number of leaf nodes of the tree structure. Additionally, the system determines public key of the key pair and a leaf node, associated with the public key, of the tree structure corresponding to the digital signature protocol (Operation 342). The system may determine the public key from persistent or transient memory of the SE hardware. The system may determine the leaf node based on metadata associated with, or embedded in, the public key.

Based on the parameter set, the system generates a set of hash values for the authentication path. As the system generates hash values for the authentication path, the hash values are added to the authentication path, for example, incrementally. The authentication path and/or the hash values may be stored in persistent or transient memory of the SE hardware as additional hash values are generated for the authentication path. Initially, the system selects the leaf node as a current node of the tree structure and the system selects the public key corresponding to the leaf node as a current hash value corresponding to the current node (Operation 344). The system adds the current hash value of the current node to the authentication path (Operation 346). The system determines a sibling node of the current node (Operation 348). Initially, because the current node is the leaf node corresponding to the key pair, the sibling node is another leaf node. In one example, a first leaf node is the current node, and a second leaf node is the sibling node. The system determines the sibling node based on the parameter set. The system generate a sibling hash value for the sibling node at least by applying a hash function to a data element of the sibling node (Operation 350). In one example, when the sibling node is a leaf node, sibling hash value is a public key corresponding to the sibling node. The system may generate the data element of the sibling node by applying a pseudorandom function to a public key seed, determined from the parameter set, to generate a pseudorandom seed. The data element of the sibling node may be the pseudorandom seed. The system may apply the hash function to the pseudorandom seed to generate the sibling hash value, for example, in a similar manner to generating a public key. Upon having generated the sibling hash value, the system adds the sibling hash value to the authentication path (Operation 352). As further described below with reference to FIG. 3D, the system adds additional sibling hash values to the authentication path to provide a set of hash values that is sufficient to compute a root hash value corresponding to a root node of the tree structure.

As shown in FIG. 3D, the system determines whether a parent node, of the current node and the sibling node, is a root node of the tree structure (Operation 354). The determination as to whether the parent node is the root node indicates whether an additional node is to be added to the authentication path. When the parent node is the root node, the root node can be computed based on the current hash value corresponding to the current node and the sibling hash value corresponding to the sibling node. When the parent node is not the root node, the system continues adding additional hash values to the authentication path to provide a set of hash values that is sufficient to compute the root hash value. The system may determine whether the parent node is the root node of the tree structure based on the height of the tree structure and the layer of the tree structure corresponding to the current node, the sibling node, and/or the parent node. The system may determine that the parent node is the root node when the layer of the tree structure corresponding to the parent node matches the height of the tree structure. The system may determine that the parent node is not the root node when the layer of the tree structure corresponding to the parent node is less than the height of the tree structure.

When the system determines that the parent node, of the current node and the sibling node, is not the root node of the tree structure, the system generates a parent hash value for the parent node at least by applying the hash function to a concatenation of the current hash value and the sibling hash value (Operation 356). The system concatenates the current hash value and the sibling hash value to obtain the concatenation. The system applies the hash function to the concatenation obtained by concatenating the current hash value and the sibling hash value. The parent hash value represents an intermediate hash value corresponding to an intermediate node of the tree structure. The tree structure may include one or more intermediate nodes. The number of intermediate nodes depends on the height of the tree structure.

The system selects the parent node as the current node and the system selects the parent hash value (e.g., the intermediate hash value) as the current hash value corresponding to the current node (Operation 358). Upon having selected the parent node as the current node and the parent hash value as the current hash value, the system returns to operation 346, where the system adds the current hash value to the authentication path. Because the system has selected the parent hash value (e.g., the intermediate hash value) as the current hash value, the system adds the parent hash value (e.g., the intermediate hash value) to the authentication path. Additional parent hash values (e.g., additional intermediate hash values) are added to the authentication path as the current hash value for sequential iterations of operation 346. Continuing with the current hash value added to the authentication path for the parent hash value, the system determines a sibling node of the current node (Operation 348). Because the system has selected the parent node (e.g., the intermediate node) as the current node, the system determines a sibling node of the parent node (e.g., a sibling node of the intermediate node). The system determines the sibling node based on the parameter set. The system generate a sibling hash value for the sibling node at least by applying the hash function to a data element of the sibling node (Operation 350). When the sibling node is a parent node (e.g., an intermediate node), the sibling hash value is an intermediate hash value corresponding to the sibling node. The system may generate the intermediate hash value corresponding to the sibling node by applying the hash function to a concatenation of the children hash values of the sibling node. The children hash values may be generated based on sequential children nodes and/or leaf nodes located below the sibling node in the tree structure. Upon having generated the sibling hash value, the system adds the sibling hash value to the authentication path (Operation 352). Upon having added the sibling hash value to the authentication path, the system again determines whether the parent node of the current node and the sibling node is the root node of the tree structure. When the system determines that the parent node of the current node and the sibling node is the root node of the tree structure, the system determines that the authentication path includes a set of hash values that is sufficient for computing the root hash value (Operation 360).

iv. Incrementally Generating Digital Signatures

Figure 3F:
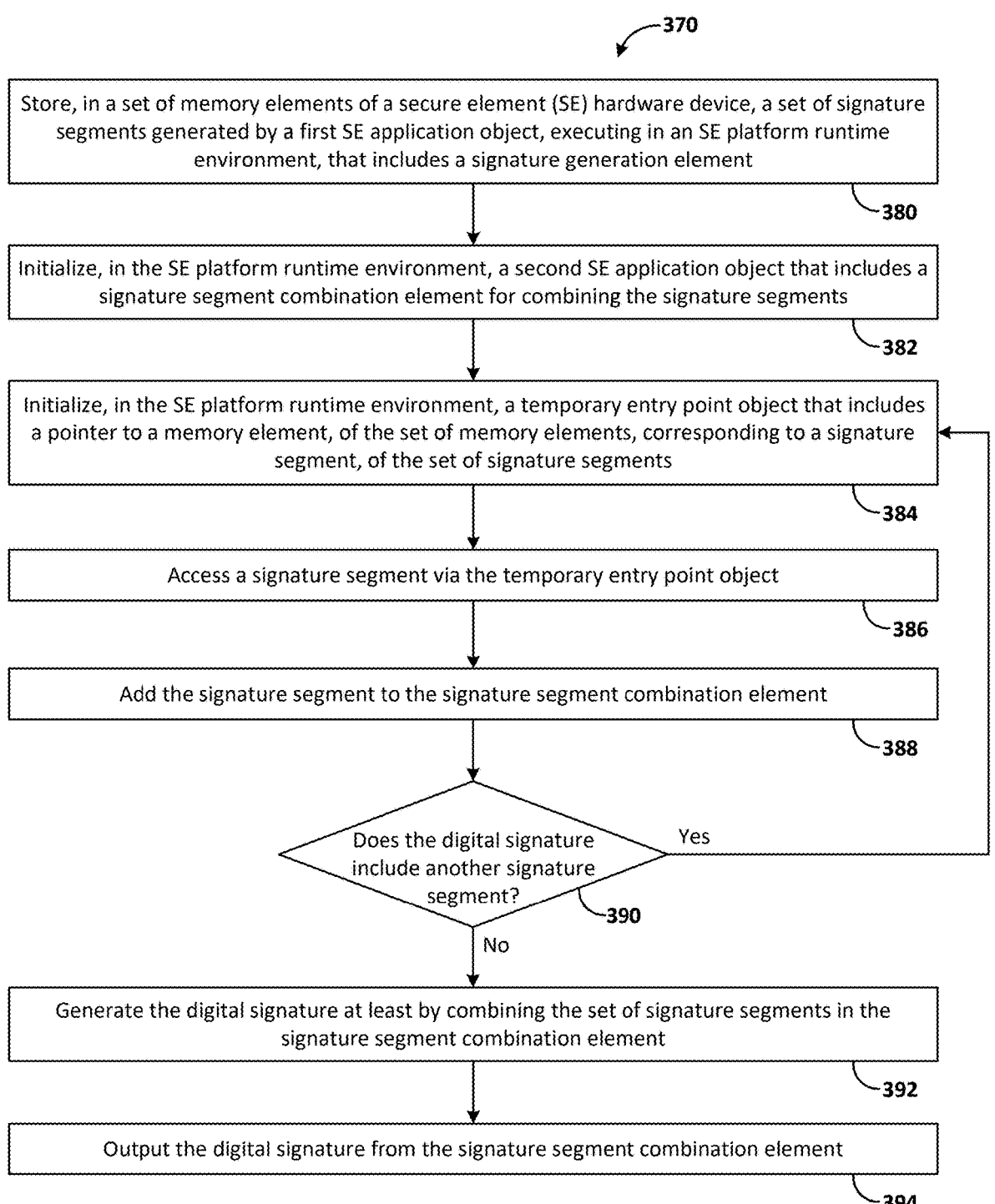

Referring to FIGS. 3E and 3F, operations 300 pertaining to generating digital signatures utilizing incremental hashing operations are further described. In one example, one or more of the operations described with reference to FIG. 3E and/or FIG. 3F may be included in operation 320 described with reference to FIG. 3B. As shown in FIG. 3E, to generate a digital signature utilizing incremental hashing operations, the system determines a signature length corresponding to the digital signature (Operation 362). The system may determine the signature length based at least in part on a private key for generating a digital signature for a message digest in accordance with a digital signature protocol. Additionally, or alternatively, the system may determine the signature length based at least in part on a hash function for generating the digital signature.

The length of a digital signature depends on the particular algorithm used for generating the digital signature. In one example, the system determines the length of the digital signature based on a key length of the private key utilized to generate the digital signature. The respective lengths may be represented in bits or bytes. In one example, for an RSA algorithm, the length of the digital signature is directly related to the length of the private key, in bytes. In one example, for a 2048-bit RSA key, the length of the digital signature is 2048 bits, or 256 bytes. As another example, for a DSA algorithm, the signature length is determined by the key length of the private key and the hash function utilized in the algorithm. In one example, for a 2048-bit DSA key paired with an SHA-256 algorithm, the length of the digital signature is 512-bit (64-byte).

The system determines, based at least in part on the signature length, a signature segment length representing a portion of the signature length (Operation 364). In one example, the signature segment length is determined by dividing the signature length by a divisor that results in a signature segment length that meets at least one threshold. In one example, the at least one threshold includes an upper threshold. The upper threshold may represent a maximum signature segment length. Additionally, or alternatively, the at least one threshold includes a lower threshold. The lower threshold may represent a minimum signature segment length. In one example, the signature segment length and/or the one or more thresholds for the signature segment length are determined at least in part on the key length of the private key and/or the hash function utilized to generate the digital signature.

Upon having determined the signature segment length, the system provides a buffer that has a length corresponding to the segment length (Operation 366). The system utilizes the buffer to generate a signature segment that represents a portion of the digital signature. (Operation 368). To generate the signature segment, the system executes the digital signature protocol, utilizing the private key, on a portion of the message digest. The signature segment is generated in the buffer. When the signature segment reaches the signature segment length, the system outputs the signature segment (Operation 370) and refreshes the buffer (Operation 372). The signature segment may be output to memory elements of the SE hardware that are utilized for temporary storage prior to combining a set of signature segments, for example, as further described below with reference to FIG. 3F. Additionally, or alternatively, the signature segment may be output to a location external to the SE hardware. The system may combine the set of signature segments at the location external to the SE hardware. In one example, the SE hardware represents a first portion of a computing entity, and the signature segment is output to a second portion of the computing entity that is separate from the SE hardware. In one example, the second portion of the computing entity includes device host hardware. In one example, the signature segment is output to the device host hardware. In one example, the set of signature segments are combined in the device host hardware to provide a digital signature. In one example, the signature segments are transmitted from a first computing entity, such as from device host hardware of the first computing entity, to a second computing entity. In one example, the second computing entity combines the signature segments to obtain the digital signature. In one example, the second computing entity may be the entity that requested the digital signature. Additionally, or alternatively, the second computing entity may validate the digital signature.

Upon having output the signature segment and refreshed the buffer, the system increments a signed length corresponding to a portion of the digital signature that has been generated by adding the signature segment length to the signed length (Operation 374). The signature segment length corresponds to the latest signature segment generated by the system. When the signature segment is the first signature segment generated by the system, the signed length is zero. Upon having incremented the signed length, the system determines whether the signed length matches the signature length (Operation 376). When the signed length matches the signature length, the system determines that the message digest is digitally signed (Operation 378). When the signed length does not match the signature length (e.g., when the signed length is less than the signature length), the system determines that the message digest is not yet fully digitally signed. The system returns to operation 368 where the system utilizes the buffer to generate an additional signature segment that represents an additional portion of the digital signature. The system continues generating additional signature segments until the signed length matches the signature length.

Referring to FIG. 3F, operations 300 pertaining to generating digital signatures utilizing incremental hashing operations are further described. In one example, one or more of the operations described with reference to FIG. 3F may be included in operation 370 described with reference to FIG. 3E. As described with reference to FIG. 3F, prior to combining a set of signature segments to provide a digital signature, the system may temporarily store one or more signature segments in transient memory of the SE hardware while additional signature segments are being generated.

As shown in FIG. 3F, the system stores a set of signature segments in a set of memory elements of the SE hardware (Operation 380). The set of signature segments may be stored in the set of memory elements incrementally as the system generates respective signature segments. The signature segments may be generated by a first SE application object executing in the SE platform runtime environment. The system may initialize a second SE application object in the SE platform runtime environment (Operation 382). The second SE application object may include a signature segment combination element for combining the signature segments generated by the first SE application object. Additionally, the system may initialize a set of temporary entry point objects in the SE platform runtime environment. The temporary entry point objects include pointers to the set of memory elements where the set of signature segments are stored. The system utilizes the temporary entry point objects to access the set of signature segments and combine them to provide a digital signature.

As shown in FIG. 3F, the system initializes, in the SE platform runtime environment, a temporary entry point object that includes a pointer to a memory element, of the set of memory elements, corresponding to a signature segment, of the set of signature segments (Operation 384). The system accesses a signature segment via the temporary entry point object (Operation 386). Additionally, the system adds the signature segment to the signature segment combination element (Operation 388). Upon having added the signature segment to the signature segment combination element, the system determines whether the digital signature includes another signature segment (Operation 390). The system may determine whether the digital signature includes another signature segment by comparing the number of signature segments accessed via temporary entry point objects to the number of signature segments stored in the set of memory elements. When the system determines that the digital signature includes another signature segment, the system returns to operation 384, where the system initializes an additional temporary entry point object to access an additional signature segment. When the system determines that the signature segment combination element includes the set of signature segments for generating the digital signature, the system generates the digital signature at least by combining the set of signature segments in the signature segment combination element (Operation 392). Upon having generated the digital signature, the system outputs the digital signature from the signature segment combination element (Operation 394).

B. Example Signature Validation Operations

Figure 4A:
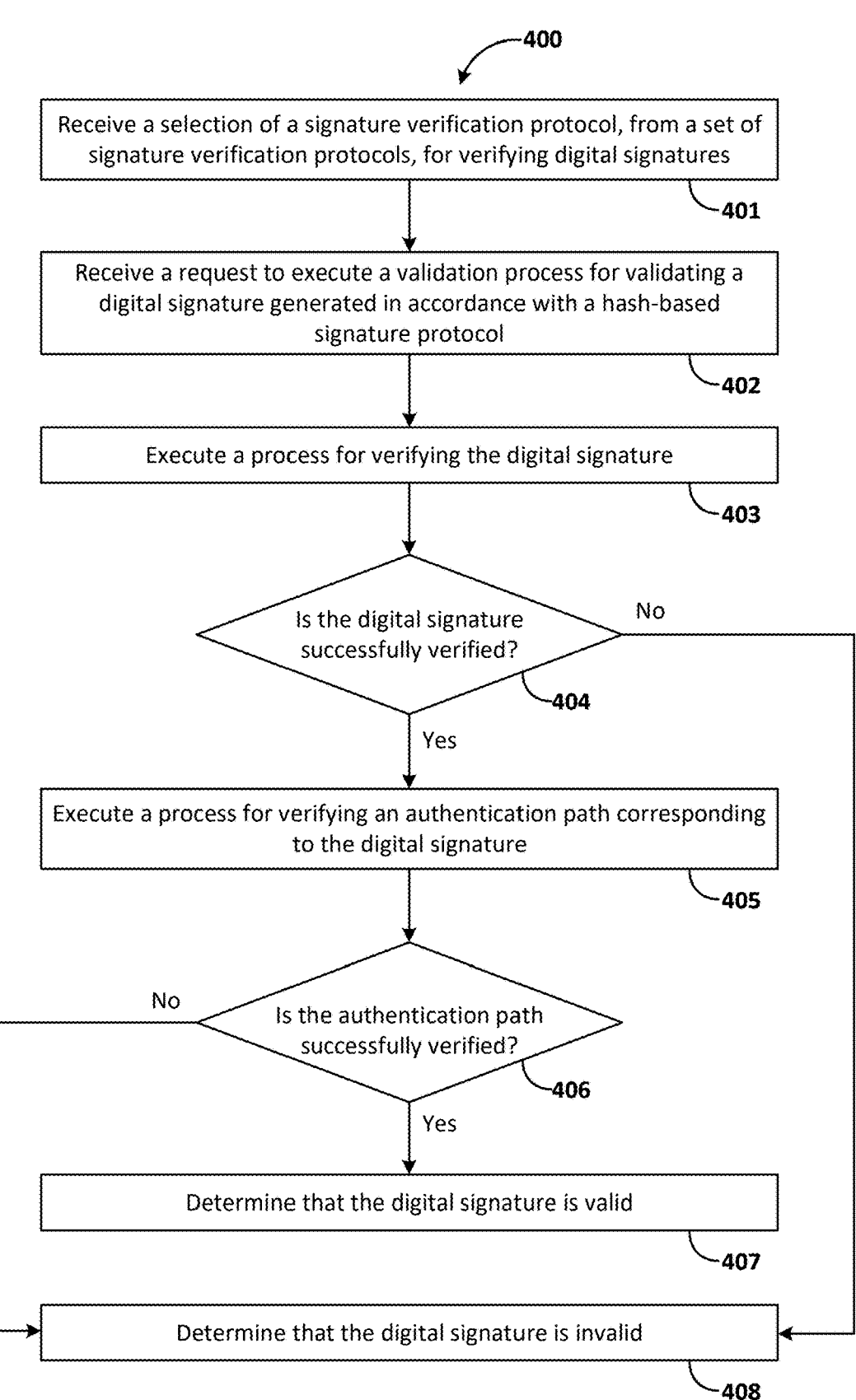

Referring to FIGS. 4A-4H, example signature validation operations 400 are further described. As shown in FIG. 4A, a system receives a selection of a signature verification protocol, from a set of signature verification protocols, for verifying digital signatures (Operation 401). The system utilizes the signature verification protocol to validate a digital signature by executing a set of one or more signature validation operations. The signature validation operations may include verifying a digital signature and/or verifying an authentication path for a digital signature. The signature verification protocol utilized in the signature validation operations 400 may correspond to a digital signature protocol utilized to generate the digital signature. The signature verification protocol may be configured to validate digital signatures generated in accordance with a hash-based digital signature protocol. The signature verification protocol may be selected based on an input from a computing entity. The input from the computing entity may include an input from an input device representing a selection by a user. The system may receive the selection via an SE interface. Additionally, or alternatively, the signature verification protocol may be selected based on one or more parameters associated with the computing entity, such as one or more parameters associated with the SE platform runtime environment. Additionally, or alternatively, the signature verification protocol may be selected based on a request to execute a validation process for validating a digital signature. The request may include an indication of the signature verification protocol for the system to utilize to validate the digital signature.

As shown in FIG. 4A, the system receives a request to execute a validation process for validating a digital signature generated in accordance with a hash-based signature protocol (Operation 402). The request to execute the validation process may be based on an input from a computing entity. The input from the computing entity may include an input from an input device representing an input by a user. The system may receive the request via an SE interface. Additionally, or alternatively, the request may be initiated based on one or more operations associated with the computing entity, such as one or more operations associated with the SE platform runtime environment. In one example, the request to execute the validation process may be generated in connection with receipt of a digital signature and/or a message associated with the digital signature.

In response to the request, the system executes the validation process. In one example, the validation process includes a process for verifying the digital signature. Additionally, or alternatively, the validation process may include a process for verifying an authentication path corresponding to the digital signature. The system may execute the process for verifying the digital signature and/or the process for verifying an authentication path.

In one example, the system executes the process for verifying the digital signature (Operation 403). Operations pertaining to the process for verifying the digital signature are described further below with reference to FIGS. 4B-4D. Upon having executed the process for verifying the digital signature, the system determines whether the digital signature successfully verified (Operation 404).

In one example, the system executes a process for verifying an authentication path corresponding to a digital signature (Operation 405). In one example, the system executes the process for verifying the authentication path at least in part responsive to determining that the digital signature is successfully verified. Operations pertaining to the process for verifying the authentication path are described further below with reference to FIGS. 4E-4H.

Upon having executed the process for verifying the authentication path, the system determines whether the authentication path successfully verified (Operation 406). In response to determining that the digital signature and the authentication path are successfully verified, the system determines that the digital signature is valid (Operation 407). In response to determining that either of the digital signature or the authentication path are not successfully verified, the system determines that the digital signature is invalid (Operation 408).

In one example, the system receives the digital signature at a first portion of a computing entity from a second portion of the computing entity that generated the digital signature. For example, the system may receive the digital signature at SE hardware. The digital signature may be transmitted to the SE hardware from device host hardware. Additionally, or alternatively, the system may receive the digital signature at a first computing entity from a second computing entity. The first computing entity and the second computing entity may represent different devices and/or different components of the same device. In one example, the system receives the digital signature from a computing entity that generated the digital signature, for example, in accordance with one or more signature generation operations described with reference to FIGS. 3A-3F.

i. Verifying Digital Signatures

Referring to FIG. 4B, operations 400 pertaining to verifying digital signatures are further described. In one example, one or more of the operations described with reference to FIG. 4B may be included in operation 403 described with reference to FIG. 4A.

As shown in FIG. 4B, to verify a digital signature, the system initializes at least one SE application object in an SE platform runtime environment (Operation 410). The system may utilize a digital signature API to initialize one or more SE application objects. An SE application object initialized in the SE platform runtime environment includes a signature verification element for verifying a digital signature. The SE application object is executed in the SE platform runtime environment to perform one or more signature verification operations for verifying the digital signature. The digital signature may be a hash-based digital signature. The system may utilize a particular SE application object to perform multiple signature verification operations. Additionally, or alternatively, the system may utilize multiple SE application objects to perform different signature verification operations.

The system obtains, via the SE application object, a digital signature and a public key corresponding to a private key utilized to generate the digital signature (Operation 411). The digital signature may be stored in persistent or transient memory of the SE hardware executing the SE platform runtime environment. The SE application object may identify and access the digital signature based on commands from a digital signature API. The commands may be provided in the form of APDUs. In one example, the system identifies and accesses the digital signature based on one or more commands, such as APDUs, from a signature validation module of the digital signature API. Based on the one or more commands, the system extracts specific bytes or segments from a command buffer such as an APDU buffer. Additionally, or alternatively, the system may access the digital signature based on object fields or arrays identified by indices or parameters of the signature validation module of the digital signature API. In one example, the system obtains the public key based on an index value of a key pair index. The index value may be embedded in the digital signature or provided in connection with the digital signature. A computing entity that generates a digital signature and a computing entity that verifies the digital signature may respectively maintain an instance of the key pair index.

Additionally, or alternatively, the system may maintain separate instances of the key pair index for generating digital signatures and verifying digital signatures. Based on the index value, the system may identify a leaf node of a tree structure associated with a hash-based signature protocol and may execute a key generation algorithm to generate a public key corresponding to the leaf node based on the key pair index value. Additionally, or alternatively, the public key may be embedded in the digital signature. Additionally, or alternatively, the key pair index and/or the public key may be included in an authentication path for the digital signature. Additionally, or alternatively, the public key may be stored in persistent or transient memory of the SE hardware. When a recipient computing entity determines the public key based on the index value, the public key need not be transmitted between the computing entities, thereby avoiding security risks associated with public keys being transmitted and potentially intercepted.

The system determines, via the SE application object, a verification protocol for verifying the digital signature (Operation 412). The verification protocol may be configured to verify digital signatures generated using the digital signature protocol corresponding to the digital signature. In one example, the digital signature is generated using a hash-based signature protocol and the verification protocol is configured to verify digital signatures generated using the hash-based signature protocol. The SE application object may determine the verification protocol to be utilized for verifying a digital signature based on metadata associated with the digital signature and/or based in information included in a request to verify the digital signature. Additionally, or alternatively, the SE application object may determine the verification protocol based on commands from the digital signature API, such as from the signature validation module of the digital signature API. The commands may be provided in the form of APDUs. The commands may include specific instructions that specify the verification protocol to be utilized. Based on the one or more commands, the system follows the verification protocol when executing the signature verification operations, thereby ensuring that the correct operations are executed in accordance with the particular verification protocol.

In one example, prior to executing operations in accordance with a particular verification protocol, the system verifies that the verification protocol is supported by the digital signature API. The system may determine whether a verification protocol is supported by comparing the verification protocol against a list of supported verification protocols. When the system determines that the verification protocol is supported, the system proceeds with execution of the verification operations to verify the digital signature in accordance with the verification protocol. When the system determines that the verification protocol is unsupported, the system may throw an error or generate an error message. Additionally, or alternatively, the system may initiate a set of operations to add the unsupported verification protocol to the set of supported verification protocols.

Upon having determined the verification protocol for verifying the digital signature, the SE application object computes a verification artifact at least by applying the verification protocol to the digital signature and the public key (Operation 413). The verification protocol utilizes a verification algorithm that applies a hash function to the digital signature and the public key to compute the verification artifact. Operations pertaining to computing verification artifacts are further described below with reference to FIGS. 4C and 4D.

In addition to computing the verification artifact, the SE application object obtains a version of the message digest that is computed independently from the version of the message digest that was digitally signed with the digital signature (Operation 414). By independently computing the message digest, the system ensures that the message digest that is utilized in the verification operations is based on an accurate and unaltered representation of the original message. The message digest is a fixed-size, numerical representation (hash) of the contents of a message. The message digest is generated by applying a hash function to the message received in connection with the digital signature. In one example, the message digest is generated outside of the SE platform runtime environment. In one example, a computing entity includes SE hardware and device host hardware. The message digest may be generated by the device host hardware and transmitted to the SE hardware. Additionally, or alternatively, the SE application object may generate the message digest. The message digest may be stored in persistent or transient memory of the SE hardware. The SE application object may identify and access the message digest based on commands from a digital signature API.

Upon having computed the verification artifact and the message digest, the SE application object verifies the verification artifact against the message digest (Operation 415). The SE application object compares the verification artifact to the message digest. When the verification artifact matches the message digest, SE application object determines that the digital signature is successfully verified. When the verification artifact does not match the message digest, the SE application object determines that the digital signature is invalid.

ii. Incrementally Verifying Digital Signatures

Figure 4C:
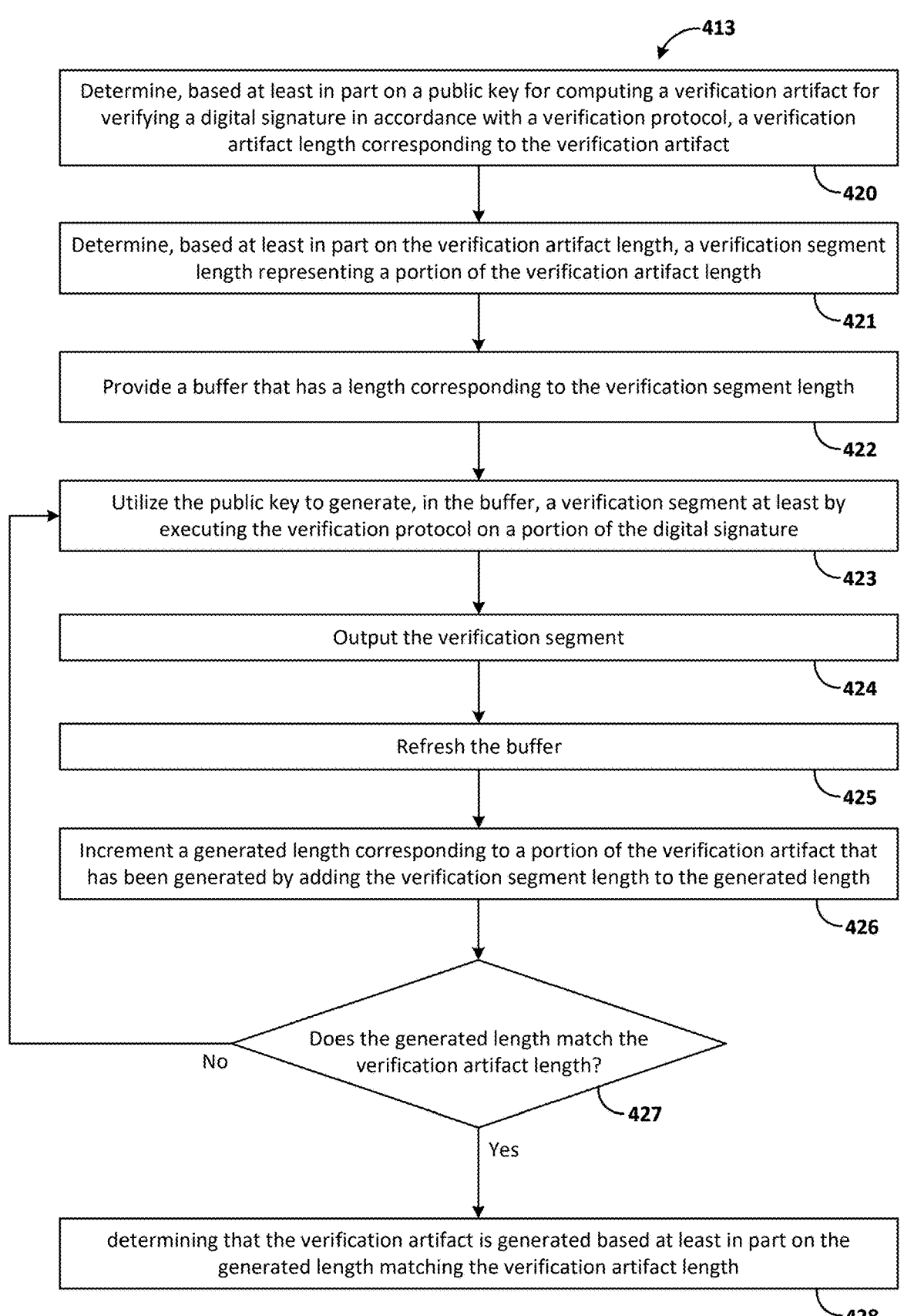

Referring to FIGS. 4C and 4D, operations 400 pertaining to verifying digital signatures utilizing incremental hashing operations are further described. In one example, one or more of the operations described with reference to FIG. 4C and/or FIG. 4D may be included in operation 413 described with reference to FIG. 4B.

As shown in FIG. 4C, to verify a digital signature utilizing incremental hashing operations, the system determines a verification artifact length corresponding to the verification artifact (Operation 420). The system may determine the verification artifact length based at least in part on a public key for generating a verification artifact for verifying a digital signature in accordance with a verification protocol. Additionally, or alternatively, the system may determine the verification artifact length based at least in part on a hash function for generating the verification artifact.

The length of a verification artifact depends on the particular algorithm used for generating the verification artifact. In one example, the system determines the length of the verification artifact based on a key length of the public key utilized to generate the verification artifact. The respective lengths may be represented in bits or bytes. In one example, for an RSA algorithm, the length of the verification artifact is directly related to the length of the public key, in bytes. In one example, for a 2048-bit RSA key, the length of the verification artifact is 2048 bits, or 256 bytes. As another example, for a DSA algorithm, the verification artifact length is determined by the key length of the public key and the hash function utilized in the algorithm. In one example, for a 2048-bit DSA key paired with an SHA-256 algorithm, the length of the verification artifact is 512-bit (64-byte).

The system determines, based at least in part on verification artifact length, a verification segment length representing a portion of the verification artifact length (Operation 421). In one example, the verification segment length is determined by dividing the verification artifact length by a divisor that results in a verification segment length that meets at least one threshold. In one example, the at least one threshold includes an upper threshold. The upper threshold may represent a maximum verification segment length. Additionally, or alternatively, the at least one threshold includes a lower threshold. The lower threshold may represent a minimum verification segment length. In one example, the verification segment length and/or the one or more thresholds for the verification segment length are determined at least in part on the key length of the public key and/or the hash function utilized to generate the verification artifact.

Upon having determined the verification segment length, the system provides a buffer that has a length corresponding to the verification segment length (Operation 422). The system utilizes the buffer to generate a verification segment that represents a portion of the verification artifact (Operation 423). To generate the verification segment, the system executes the verification protocol, utilizing the public key, on a portion of the digital signature. The verification segment is generated in the buffer. When the verification segment reaches the verification segment length, the system outputs the verification segment (Operation 424) and refreshes the buffer (Operation 425).

The verification segment may be output to memory elements of the SE hardware that are utilized for temporary storage prior to combining a set of verification segments, for example, as further described below with reference to FIG. 4D. Additionally, or alternatively, the verification segment may be output to a different SE application element for combining the verification segments.

Upon having output the verification segment and refreshed the buffer, the system increments a generated length corresponding to a portion of the verification artifact that has been generated by adding the verification segment length to the generated length (Operation 426). The verification segment length corresponds to the latest verification segment generated by the system. When the verification segment is the first verification segment generated by the system, the generated length is zero. Upon having incremented the generated length, the system determines whether the generated length matches the verification artifact length (Operation 427). When the generated length matches the verification artifact length, the system determines that verification artifact is generated (Operation 428). When the generated length does not match the verification artifact length (e.g., when the generated length is less than the verification artifact length), the system determines that the verification artifact is not yet fully generated. The system returns to operation 423 where the system utilizes the buffer to generate an additional verification segment that represents an additional portion of the verification artifact. The system continues generating additional verification segments until the generated length matches the verification artifact length.

Referring to FIG. 4D, operations 400 pertaining to generating verification artifacts utilizing incremental hashing operations are further described. In one example, one or more of the operations described with reference to FIG. 4D may be included in operation 424 described with reference to FIG. 4C. As described with reference to FIG. 4D, prior to combining a set of verification segments to provide a verification artifact, the system may temporarily store one or more verification segments in transient memory of the SE hardware while additional verification segments are being generated.

As shown in FIG. 4D, the system stores a set of verification segments in a set of memory elements of the SE hardware (Operation 430). The set of verification segments may be stored in the set of memory elements incrementally as the system generates respective verification segments. The verification segments may be generated by a first SE application object executing in the SE platform runtime environment. The system may initialize a second SE application object in the SE platform runtime environment (Operation 431). The second SE application object may include a verification segment combination element for combining the verification segments generated by the first SE application object. Additionally, the system may initialize a set of temporary entry point objects in the SE platform runtime environment. The temporary entry point objects include pointers to the set of memory elements where the set of verification segments are stored. The system utilizes the temporary entry point objects to access the set of verification segments and combine them to provide a verification artifact.

As shown in FIG. 4D, the system initializes, in the SE platform runtime environment, a temporary entry point object that includes a pointer to a memory element, of the set of memory elements, corresponding to a verification segment, of the set of verification segments (Operation 432). The system accesses a verification segment via the temporary entry point object (Operation 433). Additionally, the system adds the verification segment to the verification segment combination element (Operation 434). Upon having added the verification segment to the verification segment combination element, the system determines whether the verification artifact includes another verification segment (Operation 435). The system may determine whether the verification artifact includes another verification segment by comparing the number of verification segments accessed via temporary entry point objects to the number of verification segments stored in the set of memory elements. When the system determines that the verification artifact includes another verification segment, the system returns to operation 432, where the system initializes an additional temporary entry point object to access an additional verification segment. When the system determines that the verification segment combination element includes the set of verification segments for generating the verification artifact, the system generates the verification artifact at least by combining the set of verification segments in the verification segment combination element (Operation 436). Upon having generated the verification artifact, the system outputs the verification artifact from the verification segment combination element (Operation 437). The system may output the verification artifact to an SE application element that verifies the digital signature at least by comparing the verification artifact to a message digest, for example, as described with reference to FIG. 4B.

iii. Verifying Authentication Paths

Figure 4F:
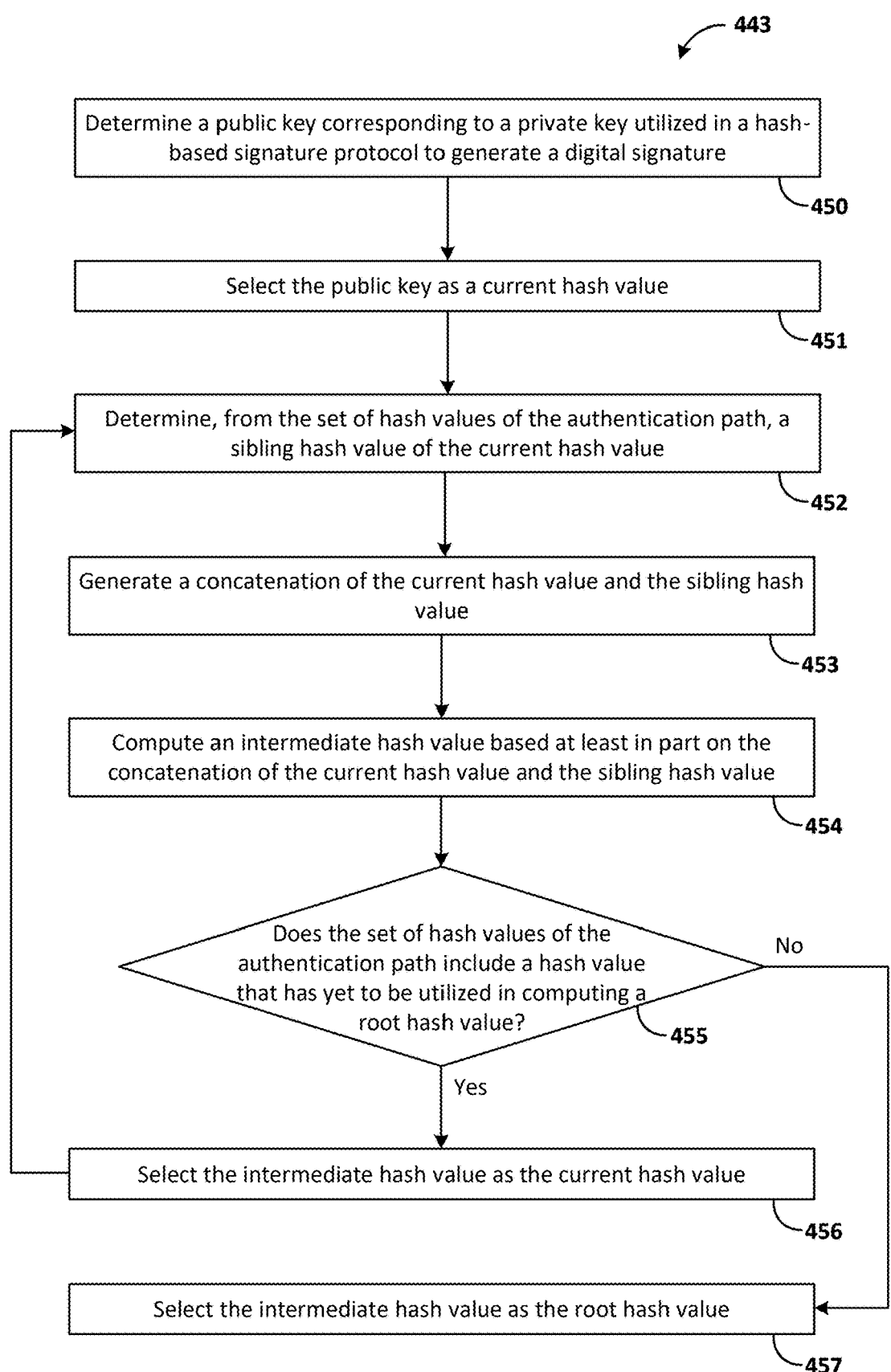

Referring to FIGS. 4E and 4F, operations 400 pertaining to verifying authentication paths are further described. In one example, one or more of the operations described with reference to FIG. 4E and/or FIG. 4F may be included in operation 405 described with reference to FIG. 4B. As shown in FIG. 4E, to verify an authentication path, the system initializes at least one SE application object in an SE platform runtime environment (Operation 440). The system may utilize a digital signature API to initialize one or SE application objects. An SE application object initialized in the SE platform runtime environment includes an authentication path verification element for verifying an authentication path for a key pair utilized to generate a digital signature. The SE application object is executed in the SE platform runtime environment to perform one or more verification operations for verifying the authentication path.

The system obtains, via the SE application object, an authentication path that includes a set of hash values corresponding to a set of nodes of a tree structure associated with a hash-based signature protocol utilized to generate the digital signature (Operation 441). The authentication path may be stored in persistent or transient memory of the SE hardware executing the SE platform runtime environment. The SE application object may identify and access the authentication path based on commands from a digital signature API. The commands may be provided in the form of APDUs. In one example, the system identifies and accesses the authentication path based on one or more commands, such as APDUs, from a signature validation module of the digital signature API. Based on the one or more commands, the system extracts specific bytes or segments from a command buffer such as an APDU buffer. Additionally, or alternatively, the system may access the authentication path based on object fields or arrays identified by indices or parameters of the signature validation module of the digital signature API. In one example, the authentication path is embedded in the digital signature. Additionally, or alternatively, the authentication path may be provided separately from the digital signature.

The system determines, via the SE application object, a verification protocol for verifying the authentication path (Operation 442). The verification protocol may be configured to verify authentication paths generated using the digital signature protocol corresponding to the digital signature. In one example, prior to executing operations in accordance with a particular verification protocol, the system verifies that the verification protocol is supported by the digital signature API.

Upon having determined the verification protocol for verifying the authentication path, the SE application object verifies the authentication path at least by computing a root hash value (Operation 443) and verifying the root hash value against a root public key associated with the digital signature (Operation 444). The root hash value corresponds to a root node of the tree structure. The SE application object computes the root hash value based on the set of hash values of the authentication path. Operations pertaining to computing the root hash value are further described below with reference to FIG. 4F.

The SE application object verifies the root hash value against the root public key at least by comparing the root hash value to the root public key. When the root hash value matches the root public key, SE application object determines that the authentication path is successfully verified. When the root hash value does not match the root public key, the SE application object determines that the authentication path is invalid.

Referring to FIG. 4F, operations 400 pertaining to computing root hash values for verifying an authentication path are further described. In one example, one or more of the operations described with reference to FIG. 4F may be included in operation 443 described with reference to FIG. 4E. The root hash value is computed based on (a) the public key corresponding to the private key utilized in the hash-based signature protocol to generate the digital signature, and (b) the set of hash values of the authentication path. The hash values represent sibling hash values corresponding to nodes of the tree structure. The public key corresponds to a first leaf node of the tree structure, and a first hash value of the set of hash values corresponds to a second leaf node of the tree structure that is a sibling node of the first leaf node. Additional hash values correspond to sibling nodes of intermediate nodes in the tree structure. A second hash value corresponds to a sibling node of a parent node to the first leaf node and the second leaf node.

To compute the root hash value, the system may execute one or more operations described with reference to FIG. 4F. As shown in FIG. 4F, the system determines the public key corresponding to the private key utilized in the hash-based signature protocol to generate the digital signature (Operation 450). The system may determine the public key based on an index value of a key pair index. In one example, the index value is included in the authentication path. Additionally, or alternatively, the index value may be embedded in the digital signature or provided separately in connection with the digital signature and/or the authentication path. Based on the index value, the system may identify a leaf node of a tree structure associated with a hash-based signature protocol and may execute a key generation algorithm to generate a public key corresponding to the leaf node based on the key pair index value. Alternatively, the public key may be included in the authentication path or the digital signature. The system selects the public key as a current hash value (Operation 451). In one example, when a computing entity that generates a digital signature and transmits the digital signature and the authentication path to another computing entity for verification, the transmitting computing entity may provide an index value, rather than a public key. Because the recipient computing entity can determine the leaf value and corresponding public key based on the index value, the public key need not be transmitted between the computing entities, thereby avoiding security risks associated with public keys being transmitted and potentially intercepted. In addition to determining the public key, the system determines, from the set of hash values of the authentication path, a sibling hash value of the current hash value (Operation 452). The set of hash values may be arranged in a string, for example, in an order corresponding to levels of the tree structure. The sibling hash value utilized first may be arranged first in the order of the string. The sibling hash value utilized last may be arranged last in the order of the string.

Upon having determined the sibling hash value, the system generates a concatenation of the current hash value and the sibling hash value (Operation 453). The concatenation is generated by joining the current hash value and the sibling hash value end-to-end to form a continuous hash value. For example, a concatenation of a first hash value with a value of 12a3b4 and a second hash value with a value of 56c7d8 is: 12a3b456c7d8. The system computes an intermediate hash value based at least in part on the concatenation of the current hash value and the sibling hash value (Operation 454). The system computes the intermediate hash value by applying a hash function to the concatenation of the current hash value and the sibling hash value. Operations pertaining to computing an intermediate hash value are further described below with reference to FIGS. 4G and 4H.

Upon having computed the intermediate hash value, the system determines whether the set of hash values of the authentication path include a hash value that has yet to be utilized in computing a root hash value (Operation 455).

The system may determine whether the authentication path includes another hash value by comparing the number of hash values utilized to the number of hash values included in the set of hash values. When the system determines that the authentication path includes another hash value, the system selects the intermediate hash value as the current hash value (Operation 456) and the system returns to operation 452 where the system determines a sibling hash value of the current hash value (e.g., a sibling hash value of the intermediate hash value selected as the current hash value). The system computes additional intermediate hash values until the system determines that the set of hash values have been utilized in computing the root hash value and/or that the authentication path does not include another hash value. When the system determines that the set of hash values have been utilized and/or that the authentication path does not include another hash value, the system selects the intermediate hash value as the root hash value (Operation 457). The system verifies the root hash value selected at operation 457 against the root public key to determine whether the root hash value matches the root public key. When the root hash value matches the root public key, the system determines that the authentication path is successfully verified.

iv. Incrementally Verifying Authentication Paths

Figure 4G:
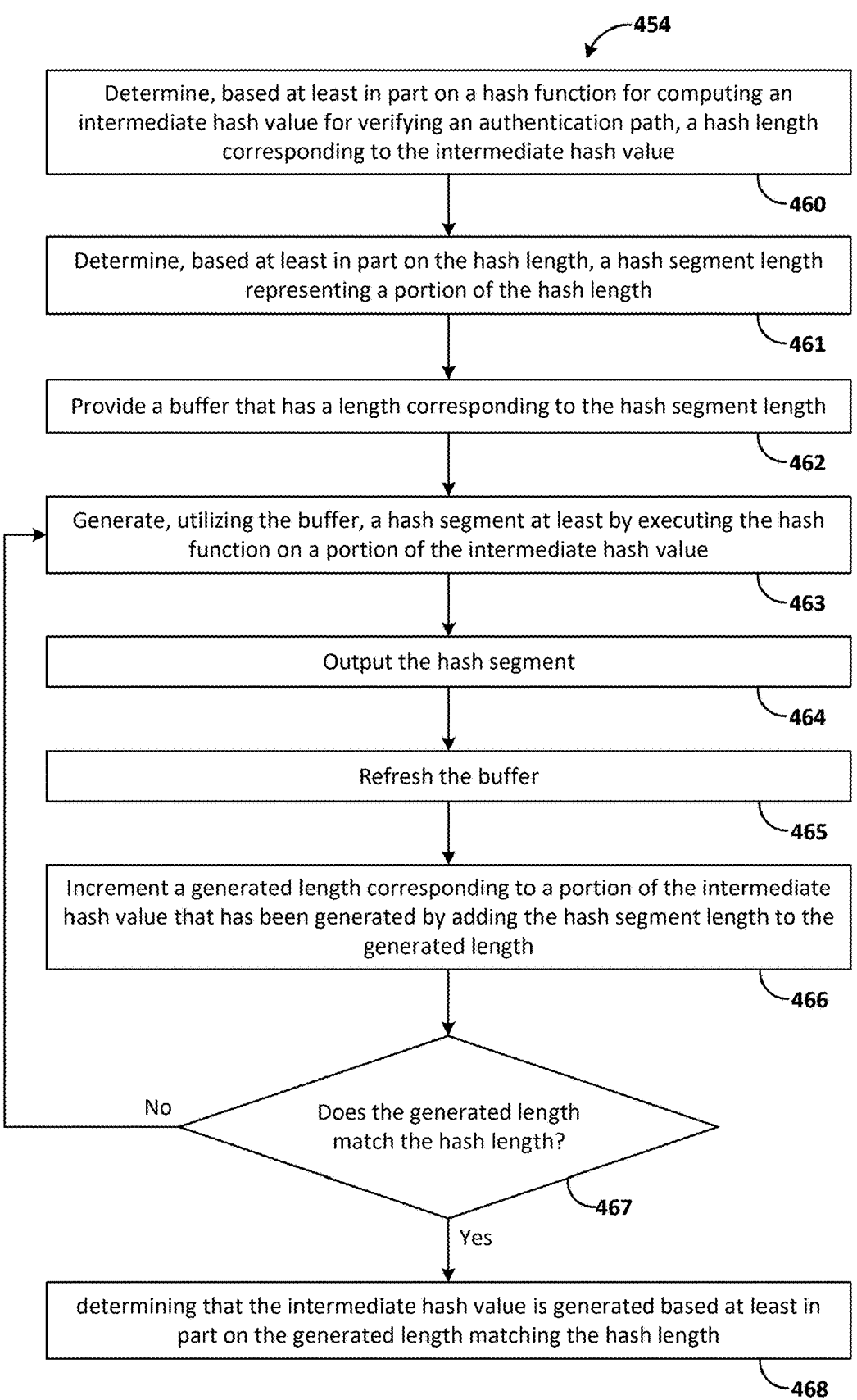

Referring to FIGS. 4G and 4H, operations 400 pertaining to verifying authentication paths utilizing incremental hashing operations are further described. In one example, one or more of the operations described with reference to FIG. 4G and/or FIG. 4H may be included in operation 454 described with reference to FIG. 4F. As shown in FIG. 4G, to compute an intermediate hash value, for verifying an authentication path, utilizing incremental hashing operations, the system determines a hash length corresponding to the intermediate hash value (Operation 460). The system may determine the hash length based at least in part on a hash function for computing the intermediate hash value. Additionally, the system determines, based at least in part on the hash length, a hash segment length representing a portion of the hash length (Operation 461).

In one example, the hash segment length is determined by dividing the hash length by a divisor that results in a hash segment length that meets at least one threshold. In one example, the at least one threshold includes an upper threshold. The upper threshold may represent a maximum hash segment length. Additionally, or alternatively, the at least one threshold includes a lower threshold. The lower threshold may represent a minimum hash segment length. In one example, the hash segment length and/or the one or more thresholds for the hash segment length are determined at least in part on the hash function utilized to generate the intermediate hash value.

Upon having determined the verification segment length, the system provides a buffer that has a length corresponding to the hash segment length (Operation 462). The system utilize the buffer to generate a hash segment that represents a portion of the intermediate hash value (Operation 463). To generate the hash segment, the system executes the hash function on a portion of the intermediate hash value. The hash segment is generated in the buffer. When the hash segment reaches the hash segment length, the system outputs the hash segment (Operation 464) and refreshes the buffer (Operation 465).

The hash segment may be output to memory elements of the SE hardware that are utilized for temporary storage prior to combining a set of hash segments, for example, as further described below with reference to FIG. 4H. Additionally, or alternatively, the hash segment may be output to a different SE application element for combining the set of hash segments.

Upon having output the hash segment and refreshed the buffer, the system increments a generated length corresponding to a portion of the intermediate hash value that has been generated by adding the hash segment length to the generated length (Operation 466). The hash segment length corresponds to the latest hash segment generated by the system. When the hash segment is the first hash segment generated by the system, the generated length is zero. Upon having incremented the generated length, the system determines whether the generated length match the hash length (Operation 467). When the generated length matches the hash length, the system determines that the intermediate hash value is generated (Operation 468). When the generated length does not match the hash length (e.g., when the generated length is less than the hash length), the system determines that the intermediate hash value is not yet fully generated. The system returns to operation 463 where the system utilizes the buffer to generate an additional hash segment that represents an additional portion of the intermediate hash value. The system continues generating additional hash segments until the generated length matches the hash length.

Referring to FIG. 4H, operations 400 pertaining to generating intermediate hash values utilizing incremental hashing operations are further described. In one example, one or more of the operations described with reference to FIG. 4H may be included in operation 464 described with reference to FIG. 4E. As described with reference to FIG. 4H, prior to combining a set of hash segments to provide an intermediate hash value, the system may temporarily store one or more hash segments in transient memory of the SE hardware while additional hash segments are being generated.

As shown in FIG. 4H, the system stores a set of hash segments in a set of memory elements of the SE hardware (Operation 470). The set of hash segments may be stored in the set of memory elements incrementally as the system generates respective hash segments. The hash segments may be generated by a first SE application object executing in the SE platform runtime environment. The system may initialize a second SE application object in the SE platform runtime environment (Operation 471). The second SE application object may include a hash segment combination element for combining the hash segments generated by the first SE application object. Additionally, the system may initialize a set of temporary entry point objects in the SE platform runtime environment. The temporary entry point objects include pointers to the set of memory elements where the set of hash segments are stored. The system utilizes the temporary entry point objects to access the set of hash segments and combine them to provide an intermediate hash value.

As shown in FIG. 4H, the system initializes, in the SE platform runtime environment, a temporary entry point object that includes a pointer to a memory element, of the set of memory elements, corresponding to a hash segment, of the set of hash segments (Operation 472). The system accesses a hash segment via the temporary entry point object (Operation 473). Additionally, the system adds the hash segment to the hash segment combination element (Operation 474). Upon having added the hash segment to the hash segment combination element, the system determines whether the intermediate hash value includes another hash segment (Operation 475). The system may determine whether the intermediate hash value includes another hash segment by comparing the number of hash segments accessed via temporary entry point objects to the number of hash segments stored in the set of memory elements. When the system determines that the intermediate hash value includes another hash segment, the system returns to operation 472, where the system initializes an additional temporary entry point object to access an additional hash segment. When the system determines that the hash segment combination element includes the set of hash segments for generating the intermediate hash value, the system generates the intermediate hash value at least by combining the set of hash segments in the hash segment combination element (Operation 476). Upon having generated the intermediate hash value, the system outputs the intermediate hash value from the hash segment combination element (Operation 477). The system may output the intermediate hash value to an SE application element that verifies the authentication path at least by computing a root hash value based on one or more intermediate hash values, for example, as described with reference to FIG. 4F.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (Saas), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications that are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally, or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
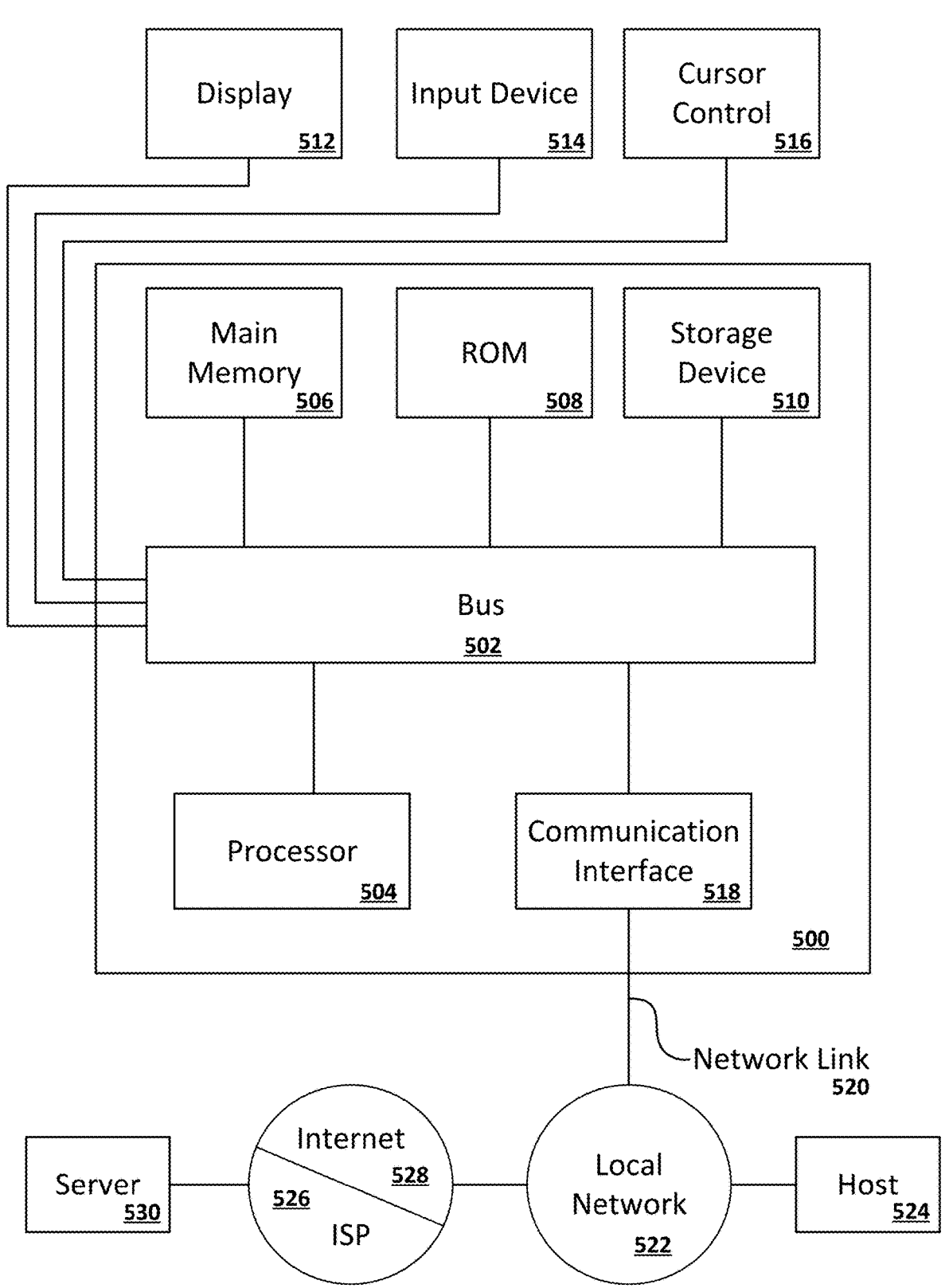
FIG. 5 shows a block diagram that illustrates a computer system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, an optical disk, or a Solid-State Drive (SSD) is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware, and/or program logic that in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510.

Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518 that carry the digital data to and from computer system 500 are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

In one or more embodiments, the systems described herein may include more or fewer components than the components described. The components described may be local to or remote from each other. The components described may be implemented in software and/or hardware. Each component may be distributed over multiple applications and/or machines. Multiple components may be combined into one application and/or machine. Operations described with respect to one component may instead be performed by another component.

In an embodiment, one or more non-transitory computer-readable storage media include instructions that, when executed by one or more hardware processors, cause performance of any of the operations described herein and/or recited in any of the claims.

In an embodiment, a method includes operations described herein and/or recited in any of the claims. The method is executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media comprising instructions that, when executed by one or more hardware processors, cause performance of operations comprising:

initializing a signature validation object in a secure element (SE) platform runtime environment, wherein the SE platform runtime environment is executing on at least one SE processor of a SE hardware device;

obtaining, via the signature validation object, an authentication path comprising a set of hash values corresponding to a set of nodes of a tree structure associated with a hash-based signature protocol utilized to generate a digital signature;

computing, via the signature validation object, a root hash value corresponding to a root node of the tree structure based on the set of hash values of the authentication path;

wherein computing the root hash value of the tree structure comprises:

computing a first intermediate hash value based at least in part on (a) a public key corresponding to a private key utilized to generate the digital signature and (b) a first hash value of the set of hash values;

determining that the set of hash values comprises a second hash value that has yet to be utilized in computing the root hash value;

responsive at least in part to determining that the set of hash values comprises the second hash value, computing a second intermediate hash value at least by applying a hash function to a concatenation of the first intermediate hash value and the second hash value;

wherein computing the root hash value of the tree structure further comprises:

prior to determining that the set of hash values comprises the second hash value that has yet to be utilized in computing the root hash value:

storing the first intermediate hash value in a first transient memory element of the SE hardware device;

initializing a temporary entry point object comprising a pointer to the first transient memory element;

responsive at least in part to determining that the set of hash values comprises the second hash value:

accessing the first intermediate hash value via the temporary entry point object;

computing the second intermediate hash value at least by applying the hash function to the concatenation of the first intermediate hash value and the second hash value;

verifying, via the signature validation object, the root hash value against a root public key associated with the digital signature;

determining, via the signature validation object, that the digital signature is valid responsive at least in part to successfully verifying the root hash value against the root public key.

2. The one or more non-transitory computer-readable media of claim 1, wherein computing the root hash value of the tree structure comprises:

determining that the set of hash values has been utilized in computing the root hash value;

responsive at least in part to determining that the set of hash values has been utilized in computing the root hash value, selecting the second intermediate hash value as the root hash value.

3. The one or more non-transitory computer-readable media of claim 1, wherein computing the second intermediate hash value comprises:

generating a first hash segment at least by executing the hash function on a first concatenation segment representing a first portion of the concatenation of the first intermediate hash value and the second hash value; and generating a second hash segment at least by executing the hash function on a second concatenation segment representing a second portion of the concatenation of the first intermediate hash value and the second hash value combining the first hash segment and the second hash segment.

4. The one or more non-transitory computer-readable media of claim 3, wherein computing the second intermediate hash value further comprises:

initializing a hash segment generation object in the SE platform runtime environment;

generating the first hash segment via the hash segment generation object;

directing, via a shareable interface object, the first hash segment from a first SE application, corresponding to the hash segment generation object to a second SE application corresponding to the signature validation object;

directing, via the shareable interface object, the second hash segment from the first SE application to the second SE application;

generating, via the signature validation object, the second intermediate hash value at least by combining the first hash segment and the second hash segment.

5. The one or more non-transitory computer-readable media of claim 4, wherein computing the second intermediate hash value further comprises:

prior to generating the second hash segment:

storing the first hash segment in the first transient memory element of the SE hardware device;

initializing the temporary entry point object comprising the pointer to the first transient memory element;

subsequent to generating the second hash segment:

accessing the first hash segment via the temporary entry point object;

combining the first hash segment and the second hash segment.

6. The one or more non-transitory computer-readable media of claim 3, wherein computing the second intermediate hash value further comprises:

prior to generating the first hash segment and the second hash segment:

determining, based at least in part on the hash function, a hash length corresponding to the second intermediate hash value;

determining, based at least in part on the hash length, a hash segment length representing a portion of the hash length;

determining at least one of:

(a) the first concatenation segment based at least in part on the hash segment length, wherein the first concatenation segment comprises a first concatenation segment length corresponding to the hash segment length, or (b) the second concatenation segment based at least in part on the hash segment length, wherein the second concatenation segment comprises a second concatenation segment length corresponding to the hash segment length.

7. The one or more non-transitory computer-readable media of claim 6, wherein computing the second intermediate hash value comprises:

determining a combined length corresponding to a combination of the first hash segment and the second hash segment;

determining that the combined length matches the hash length;

determining, based at least in part on the combined length matching the hash length, that computing the second intermediate hash value is complete.

8. The one or more non-transitory computer-readable media of claim 1, wherein computing the root hash value of the tree structure comprises:

determining, based on an index value accompanying the authentication path, the public key corresponding to the private key utilized to generate the digital signature, wherein the index value corresponds to a key pair index that identifies a first leaf node of the tree structure;

computing the first hash value based at least in part on the public key;

determining, from the authentication path, the second hash value corresponding to an intermediate node of the tree structure;

computing the root hash value of the tree structure at least by applying the hash function to a first combination of the first hash value and the second hash value.

9. The one or more non-transitory computer-readable media of claim 8, wherein computing the first hash value based at least in part on the public key comprises:

determining, from the index value accompanying the authentication path, a leaf hash value corresponding to a second leaf node of the tree structure, wherein the public key is associated with the first leaf node of the tree structure, and wherein the second leaf node is a sibling node of the first leaf node;

computing the first intermediate hash value at least by applying the hash function to a second combination of the public key and the leaf hash value;

computing the first hash value based at least in part on the first intermediate hash value.

10. The one or more non-transitory computer-readable media of claim 1, wherein computing the root hash value of the tree structure comprises:

determining, based on an index value accompanying the authentication path, the public key corresponding to the private key utilized to generate the digital signature, wherein the index value corresponds to a key pair index that identifies a key pair comprising the public key, wherein the public key is associated with a first leaf node of the tree structure;

determining, from the authentication path, the first hash value associated with a second leaf node of the tree structure, wherein the first leaf node is a first sibling node of the second leaf node;

generating the second hash value, for a first parent node of the first leaf node and the second leaf node, at least by applying the hash function to a first concatenation of the public key and the first hash value, wherein the first parent node is a first intermediate node of the tree structure;

computing the root hash value of the tree structure based at least in part on the second hash value.

11. The one or more non-transitory computer-readable media of claim 10, wherein computing the root hash value of the tree structure based at least in part on the second hash value comprises:

determining, from the authentication path, a third hash value associated with a second intermediate node of the tree structure, wherein the second intermediate node is a second sibling node of the first intermediate node;

generating a fourth hash value, for a second parent node of the first intermediate node and the second intermediate node, at least by applying the hash function to a second concatenation of the second hash value and the third hash value;

computing the root hash value of the tree structure based at least in part on the fourth hash value.

12. The one or more non-transitory computer-readable media of claim 11, wherein computing the root hash value of the tree structure based at least in part on the fourth hash value comprises:

generating a fifth hash value based at least in part on (a) the fourth hash value and (b) one or more additional hash values determined from the authentication path;

determining that the fifth hash value is the root hash value of the tree structure.

13. The one or more non-transitory computer-readable media of claim 1, wherein the operations further comprise at least one of:

executing, in the SE platform runtime environment, at least one operation on a message associated with the digital signature responsive at least in part to determining that the digital signature is valid; or outputting, from the SE platform runtime environment to a hardware device, a signature validation indicator comprising an indication that the digital signature is valid responsive at least in part to determining that the digital signature is valid.

14. The one or more non-transitory computer-readable media of claim 1, wherein the hash-based signature protocol comprises at least one of: a stateful hash-based signature protocol, a stateless hash-based signature protocol, or a one-time hash-based signature protocol.

15. The one or more non-transitory computer-readable media of claim 1, wherein the operations further comprise:

receiving, by a first SE application from a second SE application via a shareable interface object, a signature validation request for the first SE application to execute a signature validation process for validating the digital signature;

wherein, responsive at least in part to receiving the signature validation request, the first SE application initializes the signature validation object for executing at least a portion of the signature validation process.

16. The one or more non-transitory computer-readable media of claim 1, wherein the operations further comprise:

obtaining, via the signature validation object, the digital signature and the public key corresponding to the private key utilized to generate the digital signature;

computing, via the signature validation object, a verification value at least by applying a verification protocol to the digital signature and the public key;

computing, via the signature validation object, a message digest at least by applying the hash function to a message associated with the digital signature;

verifying, via the signature validation object, the verification value against the message digest;

determining, via the signature validation object, that the digital signature is valid further responsive at least in part to successfully verifying the verification value against the message digest.

17. A method, comprising:

initializing a signature validation object in a secure element (SE) platform runtime environment, wherein the SE platform runtime environment is executing on at least one SE processor of a SE hardware device;

accessing, via the signature validation object, an authentication path comprising a set of hash values corresponding to a set of nodes of a tree structure associated with a hash-based signature protocol utilized to generate a digital signature;

computing, via the signature validation object, a root hash value corresponding to a root node of the tree structure based on the set of hash values of the authentication path;

wherein computing the root hash value of the tree structure comprises:

computing a first intermediate hash value based at least in part on (a) a public key corresponding to a private key utilized to generate the digital signature and (b) a first hash value of the set of hash values;

determining that the set of hash values comprises a second hash value that has yet to be utilized in computing the root hash value;

responsive at least in part to determining that the set of hash values comprises the second hash value, computing a second intermediate hash value at least by applying a hash function to a concatenation of the first intermediate hash value and the second hash value;

wherein computing the root hash value of the tree structure further comprises:

prior to determining that the set of hash values comprises the second hash value that has yet to be utilized in computing the root hash value:

storing the first intermediate hash value in a first transient memory element of the SE hardware device;

initializing a temporary entry point object comprising a pointer to the first transient memory element;

responsive at least in part to determining that the set of hash values comprises the second hash value:

accessing the first intermediate hash value via the temporary entry point object;

computing the second intermediate hash value at least by applying the hash function to the concatenation of the first intermediate hash value and the second hash value;

verifying, via the signature validation object, the root hash value against a root public key associated with the digital signature;

determining, via the signature validation object, that the digital signature is valid responsive at least in part to successfully verifying the root hash value against the root public key.

18. A system comprising:

at least one secure element (SE) hardware processor;

the system being configured to perform operations comprising:

initializing a signature validation object in a secure element (SE) platform runtime environment, wherein the SE platform runtime environment is executing on at least one SE processor of a SE hardware device;

accessing, via the signature validation object, an authentication path comprising a set of hash values corresponding to a set of nodes of a tree structure associated with a hash-based signature protocol utilized to generate a digital signature;

computing, via the signature validation object, a root hash value corresponding to a root node of the tree structure based on the set of hash values of the authentication path;

wherein computing the root hash value of the tree structure comprises:

computing a first intermediate hash value based at least in part on (a) a public key corresponding to a private key utilized to generate the digital signature and (b) a first hash value of the set of hash values;

determining that the set of hash values comprises a second hash value that has yet to be utilized in computing the root hash value;

responsive at least in part to determining that the set of hash values comprises the second hash value, computing a second intermediate hash value at least by applying a hash function to a concatenation of the first intermediate hash value and the second hash value;

wherein computing the root hash value of the tree structure further comprises:

prior to determining that the set of hash values comprises the second hash value that has yet to be utilized in computing the root hash value:

storing the first intermediate hash value in a first transient memory element of the SE hardware device;

initializing a temporary entry point object comprising a pointer to the first transient memory element;

responsive at least in part to determining that the set of hash values comprises the second hash value:

accessing the first intermediate hash value via the temporary entry point object;

computing the second intermediate hash value at least by applying the hash function to the concatenation of the first intermediate hash value and the second hash value;

verifying, via the signature validation object, the root hash value against a root public key associated with the digital signature;

determining, via the signature validation object, that the digital signature is valid responsive at least in part to successfully verifying the root hash value against the root public key.

19. The method of claim 17, wherein computing the second intermediate hash value comprises:

generating a first hash segment at least by executing the hash function on a first concatenation segment representing a first portion of the concatenation of the first intermediate hash value and the second hash value; and generating a second hash segment at least by executing the hash function on a second concatenation segment representing a second portion of the concatenation of the first intermediate hash value and the second hash value combining the first hash segment and the second hash segment.

20. The method of claim 17, wherein computing the root hash value of the tree structure comprises:

determining, based on an index value accompanying the authentication path, the public key corresponding to the private key utilized to generate the digital signature, wherein the index value corresponds to a key pair index that identifies a first leaf node of the tree structure;

computing the first hash value based at least in part on the public key;

determining, from the authentication path, the second hash value corresponding to an intermediate node of the tree structure;

computing the root hash value of the tree structure at least by applying the hash function to a first combination of the first hash value and the second hash value.

* * * * *